(12) United States Patent
Ying et al.

(10) Patent No.: US 9,377,932 B2
(45) Date of Patent: *Jun. 28, 2016

(54) FLIPPING THROUGH CONTENT

(71) Applicant: Flipboard, Inc., Palo Alto, CA (US)

(72) Inventors: Charles Hugo Ying, Piedmont, CA (US); Marcos A. Weskamp, Palo Alto, CA (US); Michael S. McCue, Palo Alto, CA (US); Didier Hilhorst, San Francisco, CA (US); Michael Johnston, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,705

(22) Filed: Aug. 25, 2015

(65) Prior Publication Data

US 2015/0370432 A1 Dec. 24, 2015

Related U.S. Application Data

(63) Continuation of application No. 14/590,816, filed on Jan. 6, 2015, now Pat. No. 9,134,883, which is a continuation of application No. 13/284,678, filed on Oct. 28, 2011, now Pat. No. 8,935,629.

(51) Int. Cl.
| | |
|---|---|
| *G06F 3/0483* | (2013.01) |
| *G06F 3/0488* | (2013.01) |
| *G06F 3/0485* | (2013.01) |
| *G06F 3/0482* | (2013.01) |
| *G06F 3/0484* | (2013.01) |
| *G06T 13/80* | (2011.01) |
| *H04M 1/725* | (2006.01) |

(52) U.S. Cl.
CPC ............ *G06F 3/0483* (2013.01); *G06F 3/0482* (2013.01); *G06F 3/0485* (2013.01); *G06F 3/04842* (2013.01); *G06F 3/04883* (2013.01); *G06T 13/80* (2013.01); *G06T 2200/24* (2013.01); *H04M 1/72544* (2013.01); *H04M 2250/22* (2013.01)

(58) Field of Classification Search
CPC ... G06F 3/0483; G06F 3/0482; G06F 3/0485; G06F 3/0488
USPC .......................................................... 715/776
See application file for complete search history.

(56) References Cited

U.S. PATENT DOCUMENTS

| | | | |
|---|---|---|---|
| 8,473,860 B2 | 6/2013 | Fong et al. | |
| 8,713,011 B2 | 4/2014 | Asai et al. | |
| 8,756,523 B2 | 6/2014 | Chiba et al. | |
| 8,788,964 B2 | 7/2014 | Shin et al. | |

(Continued)

OTHER PUBLICATIONS

PCT International Search Report and Written Opinion, PCT/US2012/062046, Jan. 9, 2013, 9 pages.

(Continued)

*Primary Examiner* — Andrea Leggett
(74) *Attorney, Agent, or Firm* — Fenwick & West LLP

(57) ABSTRACT

Systems and methods for enabling users to rapidly flip through displayed pages of content in an intuitive manner are provided. Graphical animations for transitioning from one page to another can be executed so that portions of three or more pages can be simultaneously viewed. This enables a user to make snap judgments as to whether she wishes to explore anyone of those pages in more detail as she rapidly flips through the pages.

20 Claims, 37 Drawing Sheets

(56) References Cited

U.S. PATENT DOCUMENTS

| | | |
|---|---|---|
| 8,799,778 B2 | 8/2014 | Flynn et al. |
| 8,819,569 B2 | 8/2014 | SanGiovanni et al. |
| 2005/0022139 A1 | 1/2005 | Gettman et al. |
| 2007/0016671 A1 | 1/2007 | Lee et al. |
| 2009/0007017 A1* | 1/2009 | Anzures ............ G06F 3/04883 715/835 |
| 2009/0172532 A1 | 7/2009 | Chaudhri |
| 2011/0078560 A1 | 3/2011 | Weeldreyer et al. |
| 2012/0096392 A1 | 4/2012 | Ording et al. |
| 2013/0080968 A1 | 3/2013 | Hanson et al. |
| 2013/0205202 A1 | 8/2013 | Xiao et al. |

OTHER PUBLICATIONS

US Office Action, U.S. Appl. No. 13/284,678, Mar. 26, 2014, 18 pages.

* cited by examiner

FLIPPING THROUGH CONTENT

CROSS REFERENCE TO RELATED APPLICATIONS

This application is a continuation of co-pending U.S. application Ser. No. 14/590,816, filed Jan. 6, 2015, which is a continuation of U.S. application Ser. No. 13/284,678 (now U.S. Pat. No. 8,935,629), filed Oct. 28, 2011, each of which is incorporated by reference their entirety.

FIELD OF THE INVENTION

The disclosed embodiments relate generally to electronic devices, and more particularly, to electronic devices that enable users to rapidly peruse content in an intuitive manner.

BACKGROUND OF THE DISCLOSURE

Digital media content is plentiful and pervasive in today's online society. This content can be obtained from several data sources and presented for display on a user's electronic device. Different applications running on the electronic device can present the content in any number of different ways. For example, a web browser can present content based on the HTML coding of the webpage. As another example, various content aggregating applications such as Facebook™ and Twitter™ can present content according to predefined templates. Since the quantity of content that can be presented is virtually limitless, what is needed is an efficient approach for presenting content and providing users with intuitive navigational access to the content.

SUMMARY OF THE DISCLOSURE

Systems and methods for enabling users to rapidly flip through displayed pages of content in an intuitive manner are provided. Graphical animations for transitioning from one page to another can be executed so that portions of three or more pages can be simultaneously viewed. This enables a user to make snap judgments as to whether she wishes to explore any one of those pages in more detail as she rapidly flips through the pages. Various embodiments and details of how a user can rapidly flip through and view multiple pages at once are discussed in more detail in the detailed discussion below.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
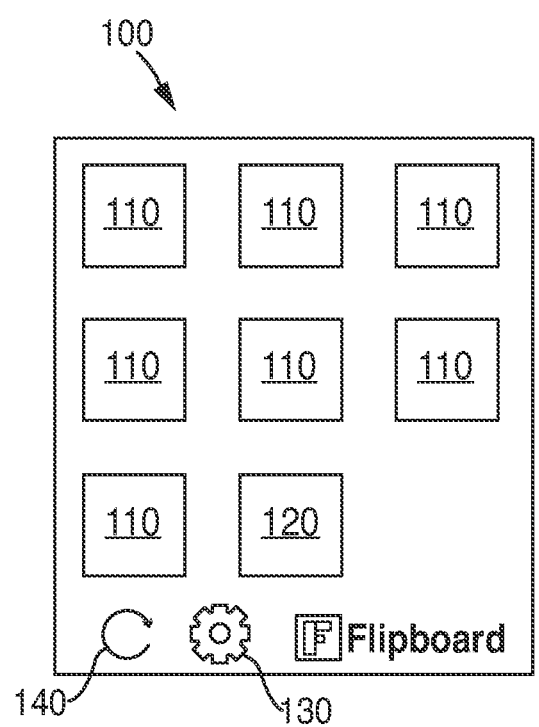
FIG. 1 shows an illustrative home screen that may be provided by a content aggregating application in accordance with an embodiment of the invention.

Systems and methods for enabling a user to rapidly flip through displayed content are provided.

Embodiments of this invention can be implemented by an application running on an electronic device. The application may be a content aggregator type of application that is capable of sourcing media content from any suitable number of data sources. For example, the application can present a user with several selectable high-level categories (e.g., news, tech, sports, lifestyle), each of which may be associated with one more data sources. When the user selects one of the high-level categories, content sourced from one or more of the data sources associated with the selected category can be made available for viewing in accordance with embodiments of the invention.

The sourced content can be any suitable media such as, for example, printed media, video media, or audio media. Each data source can provide one or more articles or other content assets that can be viewed on the electronic device. Each article or content asset can be succinctly represented by a single page. When viewed, this page provides its reader with enough information to enable her to make a snap judgment as to whether she wants to read the article in more detail. For example, the single page can include artwork and a title representative of the article. In another embodiment, multiple articles can be shown at once. For example, two or three articles may be displayed, each having its own title, artwork, and text.

When a user selects one of the high level categories, the application may enter into a "flip" mode of navigation in accordance with an embodiment of the invention. In the flip navigation mode, the user can flip through a sequence of single pages representative of each article or content asset associated with the selected category by inputting touch gestures on the device. The user can flip through the sequence by going forward or backward. Though it will be understood that if the sequence is at the beginning, the user cannot flip backwards to the previous page, and if the sequence is at the end, the user cannot flip forward to the next page.

The flip is a transition animation in which either a top half or a bottom half of a currently visible page folds onto its other half, and as the currently visible pages fold on to itself, a different page unfolds in place of the current page. For example, assume a current page has a first half and second half, and that a different page has a third half and a fourth half. Further assume that the second and third halves are attached to each other. When the second half flips up towards the first half, the third half also flips up. As the second and third halves begin to flip up, a portion of the fourth half becomes visible. As the angle between the fourth half and the mated second and third halves increases, more and more of the fourth half can be seen, and less of the first half can be seen. When the angle reaches 180 degrees, none of the current page can be seen because the different page has fully flipped into view.

The user can control the speed in which she flips through the pages. The speed in which each transition animation is performed is based on the input gesture, which can be swipe gesture. The swipe gesture can include touchdown location (e.g., of a finger) on the device, drag time duration and speed across the screen, and liftoff location (e.g., of the finger) from the device. Each of these factors can determine whether the user intends to rapidly or slowly flip through the pages.

The user can rapidly flip through the pages by quickly inputting touch gestures (e.g., such as a series of rapid swiping motions) on the device. This rapid flip can provide the user with the impression she is thumbing through a rolodex. In some embodiments, if a sufficient number of input gestures are received within a predetermined period of time, the user may be presented with multiple pages at once. That is, two or more pages can be simultaneously inflight, thereby showing the user portions of at least three different pages simultaneously. Each flip transition animation is keyed off an input gesture, thereby prevent any scrolling between pages.

The user can slowly flip through the pages by inputting a relatively slow touch gesture on the device. In a "slow" flip, the transition animation flips the page at pace slower than the fast flip transition. Depending on the swipe gesture factors, the user can slowly pick up half of the page and flip it over. Alternatively, the user can pick up the page, but not move her finger far enough over, thereby resulting in having that page fall back down to its starting position.

After the user has finished flipping through the pages, she can select the current page to access more content associated with that page. For example, after tapping on the current page, the application will open up the article so the user can begin reading. The article can include several pages of content, and if the user desires, she may rapidly flip through those pages in accordance with embodiments of the invention.

FIG. 1 shows an illustrative home screen 100 that may be provided by a content aggregating application in accordance with an embodiment of the invention. Screen 100 can include several selectable content categories 110, user configuration option 120, settings option 130, and refresh option 140. Each of content categories 110 is associated with one or more data sources, from which content can be sourced for viewing or playback on an electronic device. For example, categories 110 can include news, technology, sports, lifestyle, social networks, blogs, videos, user favorites, and the like.

User configuration option 120 may enable a user to customize the content obtained by the application. For example, the user can define which categories 110 appear on screen 100 and the user can create one or more custom categories 110. Settings option 130 can enable a user to set settings for how the application operates. For example, the user can set how often the application polls the data sources for new content. Refresh option 140 can enable a user to manually refresh the sourced content associated with one or more categories 110.

Figure 2A:
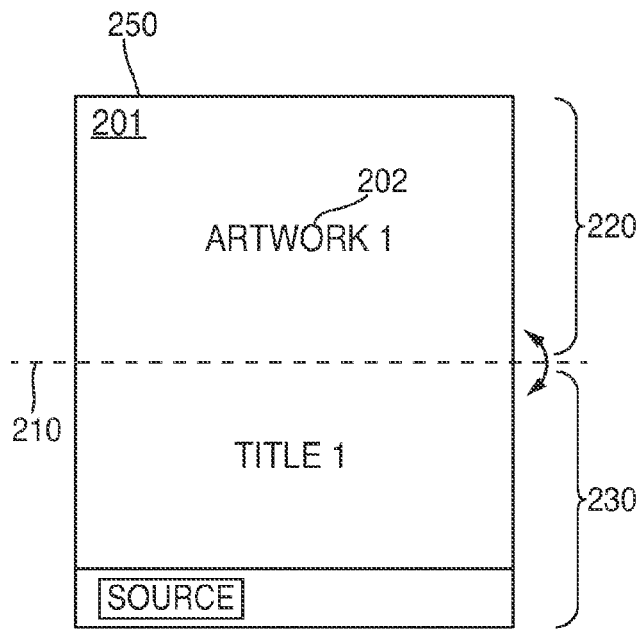
FIG. 2A shows an illustrative screen of a page that may be displayed when a user selects a category in the screen of FIG. 1 in accordance with an embodiment of the invention.

When a user selects one of categories 110, the application can transition from screen 100 to screen 200 of FIG. 2A. The transition from screen 100 to screen 200 can be performed in any number of different ways. In one embodiment, screen 200 can flip into view over screen 100. The flip can be implemented as one of several different transition animations, which are discussed in more detail below. For example, the transition animation between screens 100 and 200 can be a multiflip transition animation as discussed below in connection with the description accompanying FIGS. 11-12. It is understood that transition animations other than flip animations may be used when transitioning from screen 100 to screen 200 such as, for example, a sliding transition or a fading in transition.

FIG. 2A shows an illustrative screen 200 of a page that may be displayed when a user selects a category in screen 100 of FIG. 1 in accordance with an embodiment of the invention. Page 201 in screen 200 may be limited to showing content associated with only one article or content asset. This may be because the form factor of the device having screen 200 is limited in size (e.g., such as in a hand-held or pocket-sized device). Page 201 can include artwork 202, title 204, and source identifier 206. Artwork 202, title 204, and source identifier 206 are derived from content sourced from a data source and the arrangement of page 201 is designed to minimize the time required for a user to ascertain its contents so she can make a snap judgment as to whether to further explore the article or asset content. In other words, page 201 is a single asset cover page representative of the article or asset that can be accessed by the user if she so desires.

A different page can exist for each article or content asset associated with the category selected in screen 100. These pages can be rendered and/or stored locally on or remote from the device running the application. In some embodiments, a predetermined number of pages can be stored in cache memory so that they can quickly accessed and rendered for display or for use in flip transition animations according to embodiments of the invention.

During a flip transition animation, page 201 can fold over itself about flip axis 210. Flip axis 210 can be a center axis that bisects the portrait orientation of screen 200 at its midpoint. Since page 201 is oriented in a portrait mode (i.e., the aspect ratio is such that the top-to-bottom dimensions are greater than the left-to-right dimensions), page 201 can fold onto itself in a vertical direction. For example, top half 220 can fold down over bottom half 230, or in the alternative, bottom half 230 can fold up over top half 220. If desired, however, page 201 can flip over itself in a horizontal direction, a diagonal direction, or any other suitable direction.

Figure 2B:
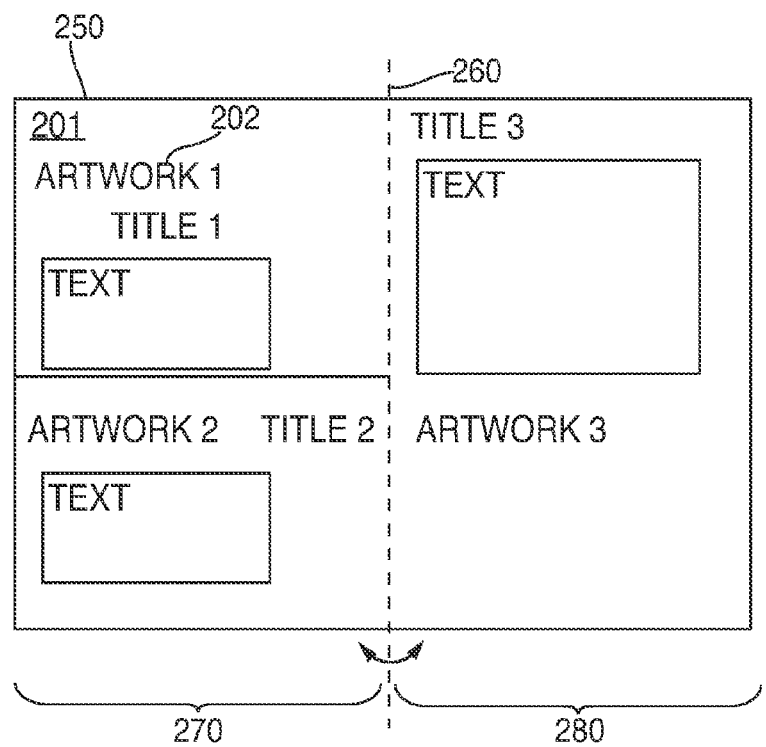
FIG. 2B shows an illustrative screen of a page that may be displayed when a user selects a category in the screen of FIG. 1 in accordance with an embodiment of the invention.

FIG. 2B shows an illustrative screen 250 of page 251 that may be displayed when a user selects a category in screen 100 of FIG. 1 in accordance with an embodiment of the invention. Page 251 can show content associated with two or more articles or content assets. This may be because the form factor of the device having screen 250 has a larger size (e.g., such as a tablet-sized device or monitor). As illustrated, content associated with three different articles is shown. The content can include artwork, a title, and text (typically a truncated version of the full text) for each article.

During a flip transition animation, page 251 can flip onto itself about flip axis 260. Flip axis 260 bisects page 251 along a vertical axis, thereby splitting page 251 in left and right halves 270 and 280. Thus during a flip transition, page 251 folds onto itself in a horizontal direction. For example, in a left-to-right transition, left half 270 can fold over right half 280, and in a right-to-left transition, right half 280 can fold over left half 270.

Figure 3:
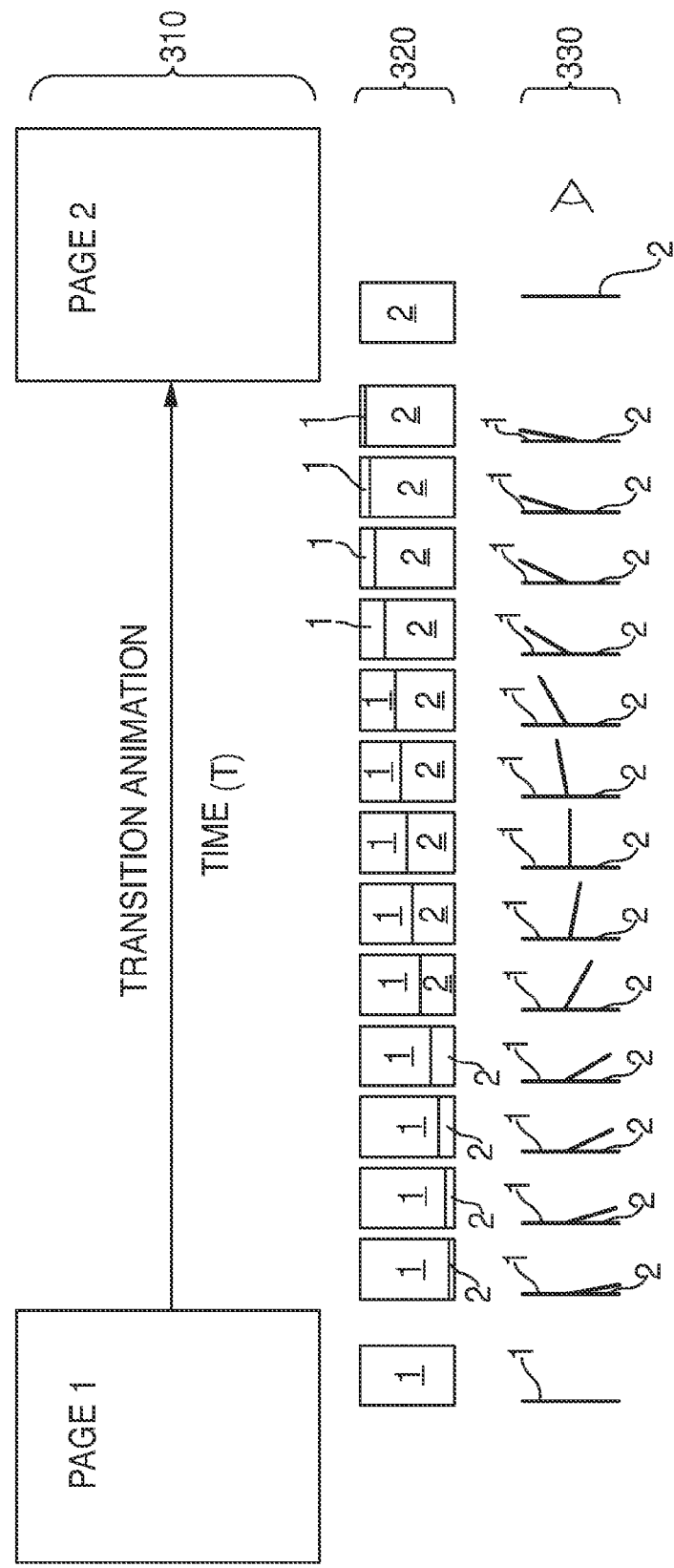
FIG. 3 shows a flip transition animation from one page to another in accordance with an embodiment of the invention.

FIG. 3 shows a flip transition animation from one page to another in accordance with an embodiment of the invention. The transition animation begins with page 1 and ends with page 2, as illustrated by generic layer 310. The transition animation takes time (T) to complete, where T can be any period of time. For purposes of illustrative discussion, assume the transition is a vertical transition taken along a flip axis running horizontally across the page. FIG. 3 also has top view layer 320 that shows a top view of the transition animation and side view layer 330 that shows a hypothetical side view of the transition animation. The numbers 1 and 2 shown in each time slice of layers 320 and 330 illustrate the viewable portions of the pages.

Figure 5:
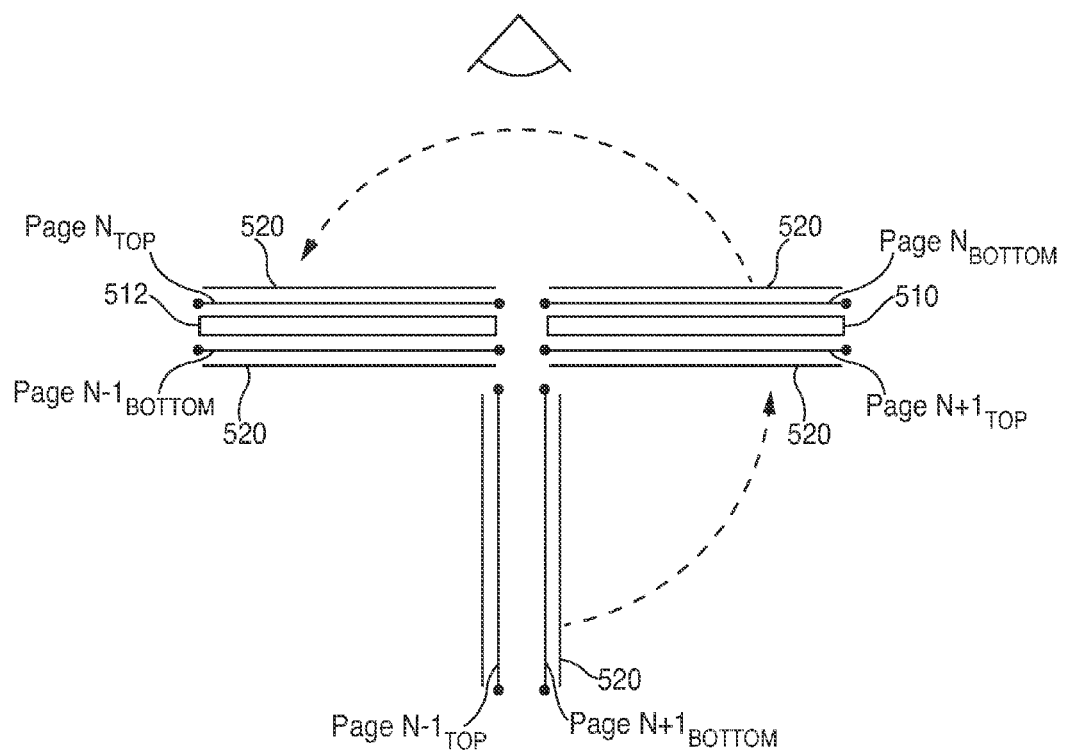
FIG. 5 illustrates how pages are converted into animation elements for use in a flip transition animation in accordance with an embodiment of the invention.

Beginning on the left side of FIG. 3, the transition animation starts with page 1 being the only page that can be viewed by a user. When the transition begins, both pages 1 and 2 are divided into halves. Page 1 has first and second halves, and page 2 has third and fourth halves. The bottom of second half is "mated" to the top of the third half. (FIG. 5 provides a more detailed explanation on how the pages are organized in different layers and mated to each other.) As the transition begins, page 1 begins to take flight by lifting off page 2. More particularly, the mated combination of the second and third halves lift off the fourth half, thereby partially revealing page 2. However, for convenience, page 1 is considered as the inflight page. As page 1 continues its inflight transition, more and more of page 2 is revealed, and page 1 becomes more covered. Then, at the end of time T, only page 2 is visible to the user.

FIGS. 4A-G illustrate a flip transition animation sequence from one page to another page in accordance with an embodiment of the invention. FIGS. 4A-G show flip axis 410 and pages 420 and 430 to the extent any such portions thereof are visible. Page 420 has halves 422 and 424, and page 430 has halves 432 and 434. The appropriate halves are shown depending on the time slice of the animation sequence. The flip transition animation is a bottom to top vertical flip.

Figure 4A:
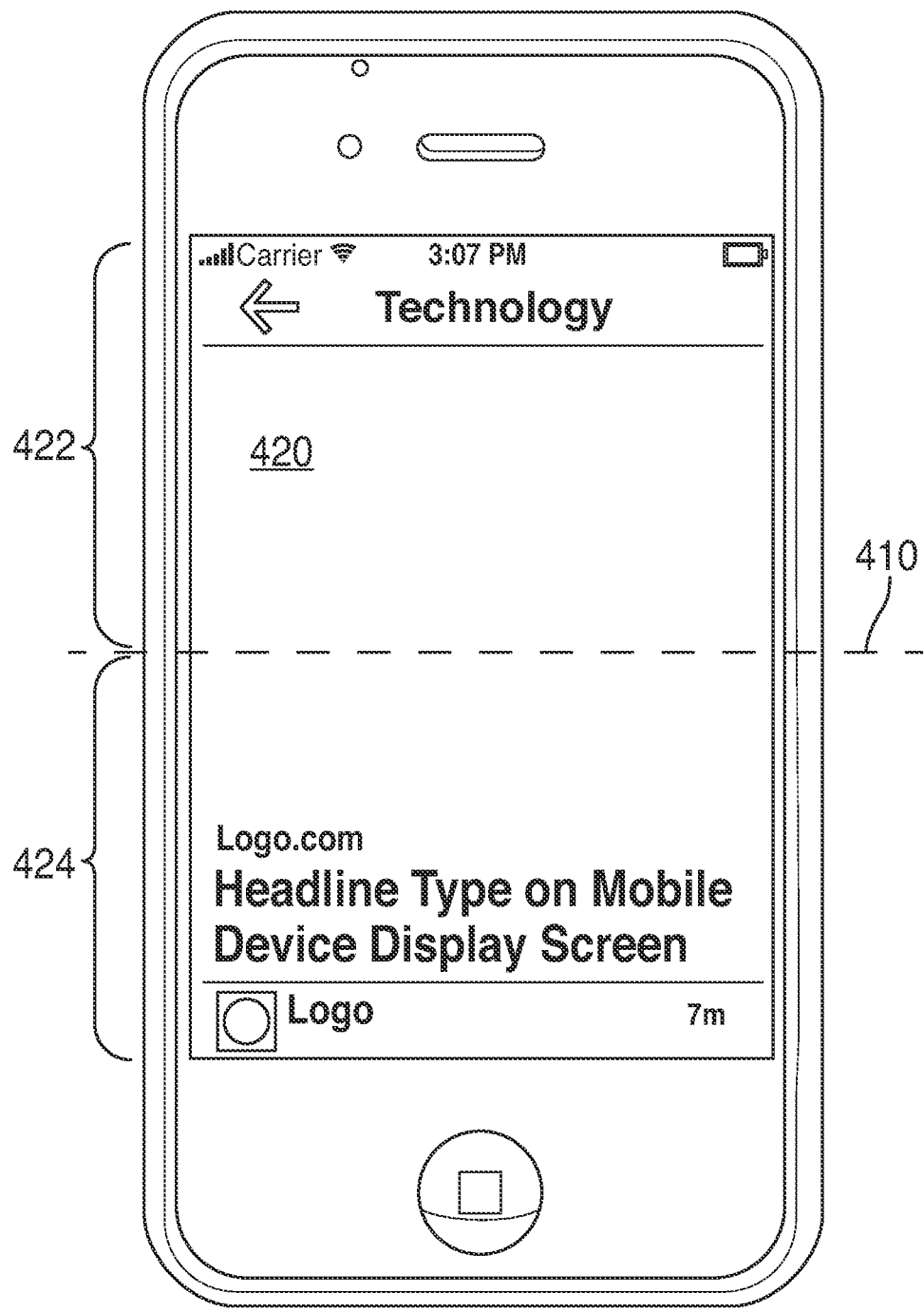
FIGS. 4A-G illustrate a flip transition animation sequence from one page to another page in accordance with an embodiment of the invention.
Figure 4B:
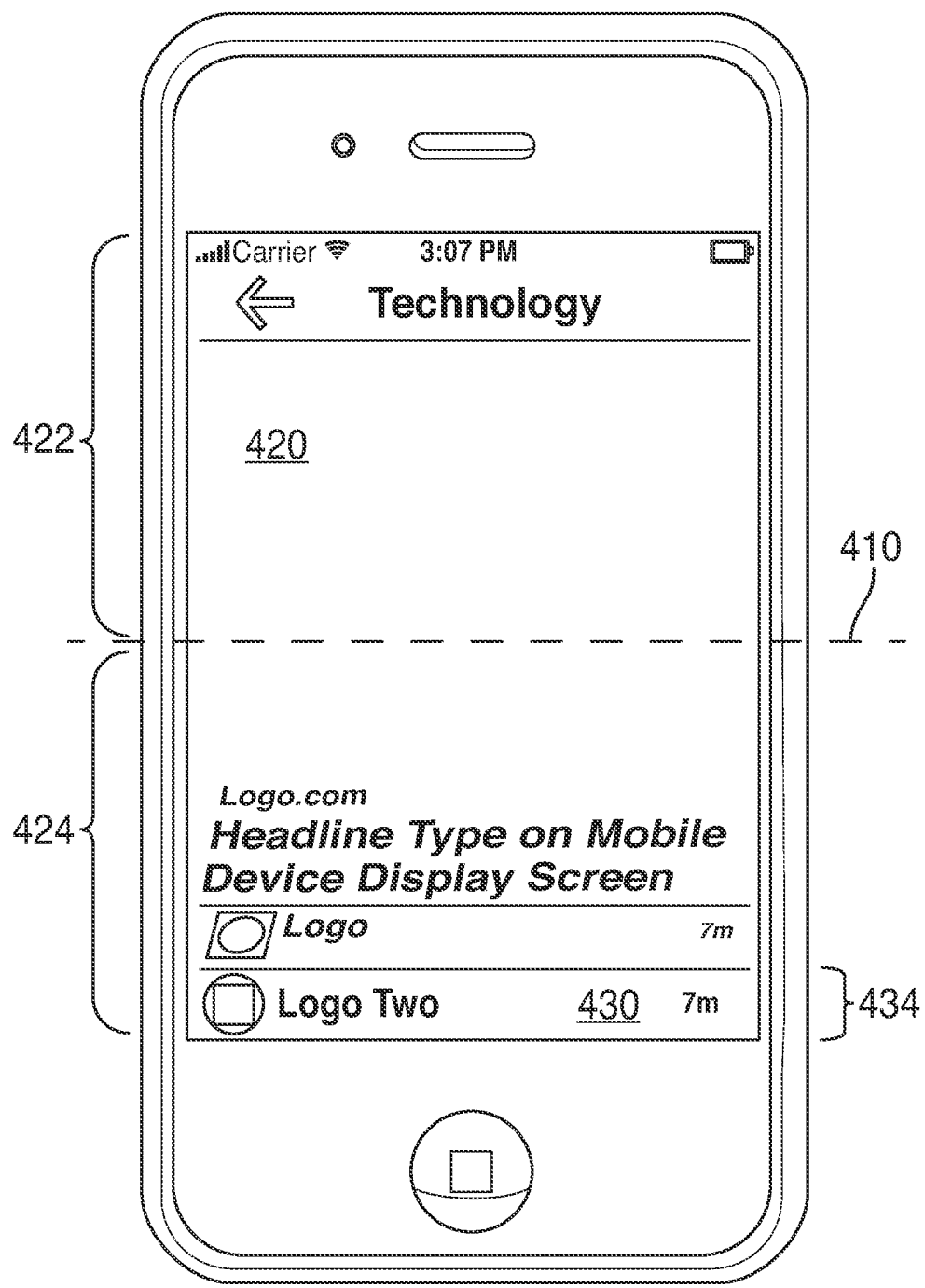
Figure 4C:
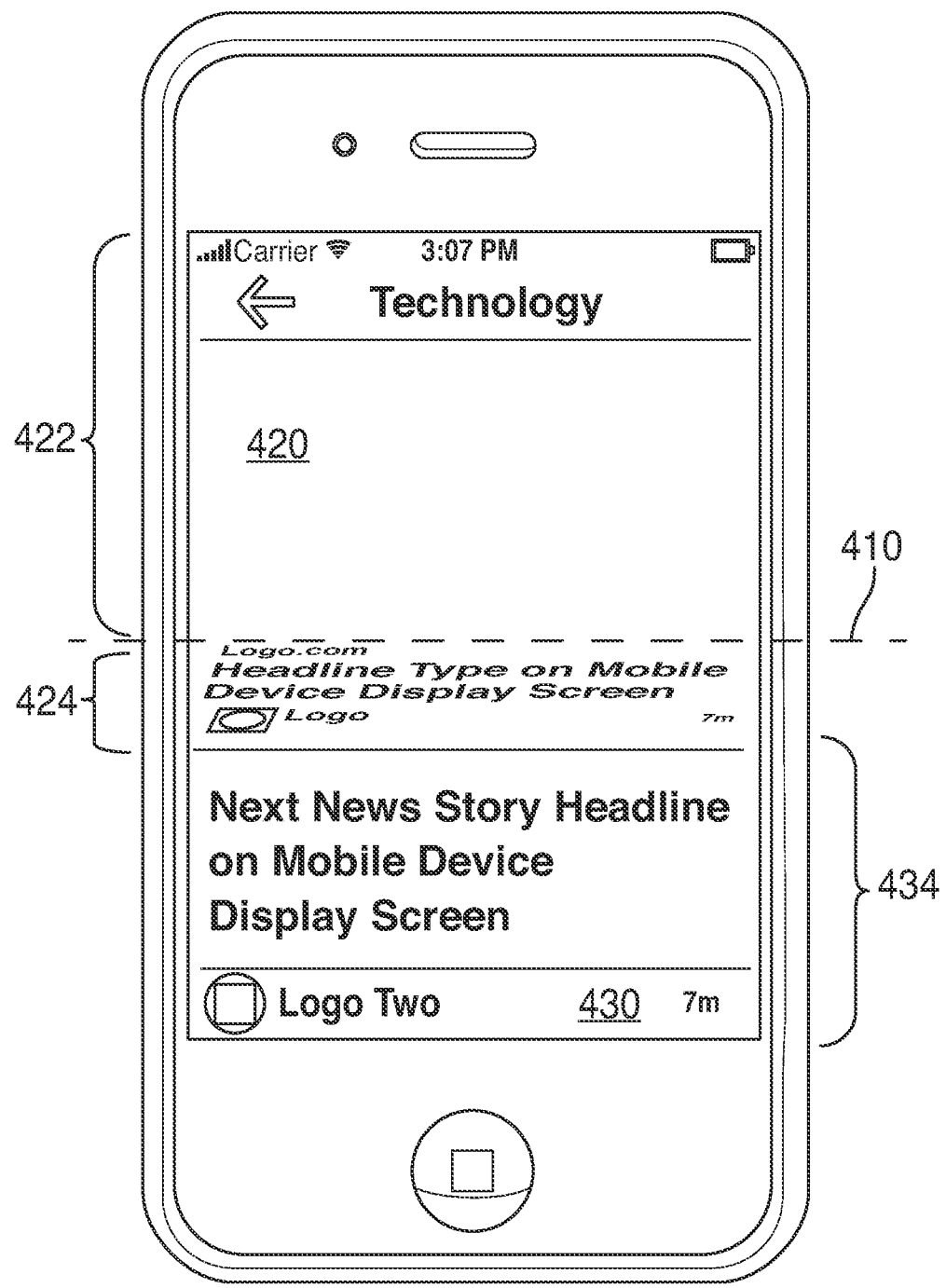
Figure 4D:
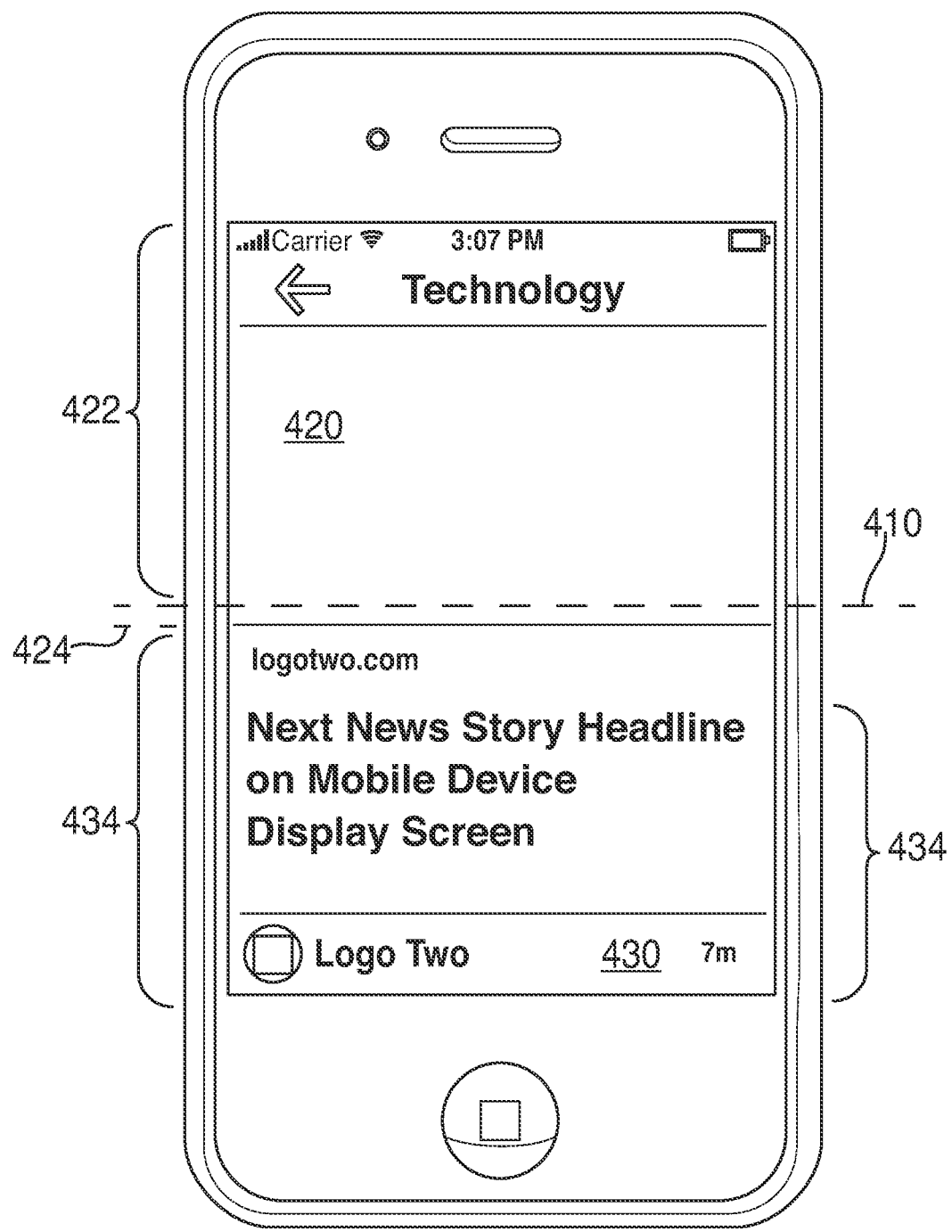
Figure 4E:
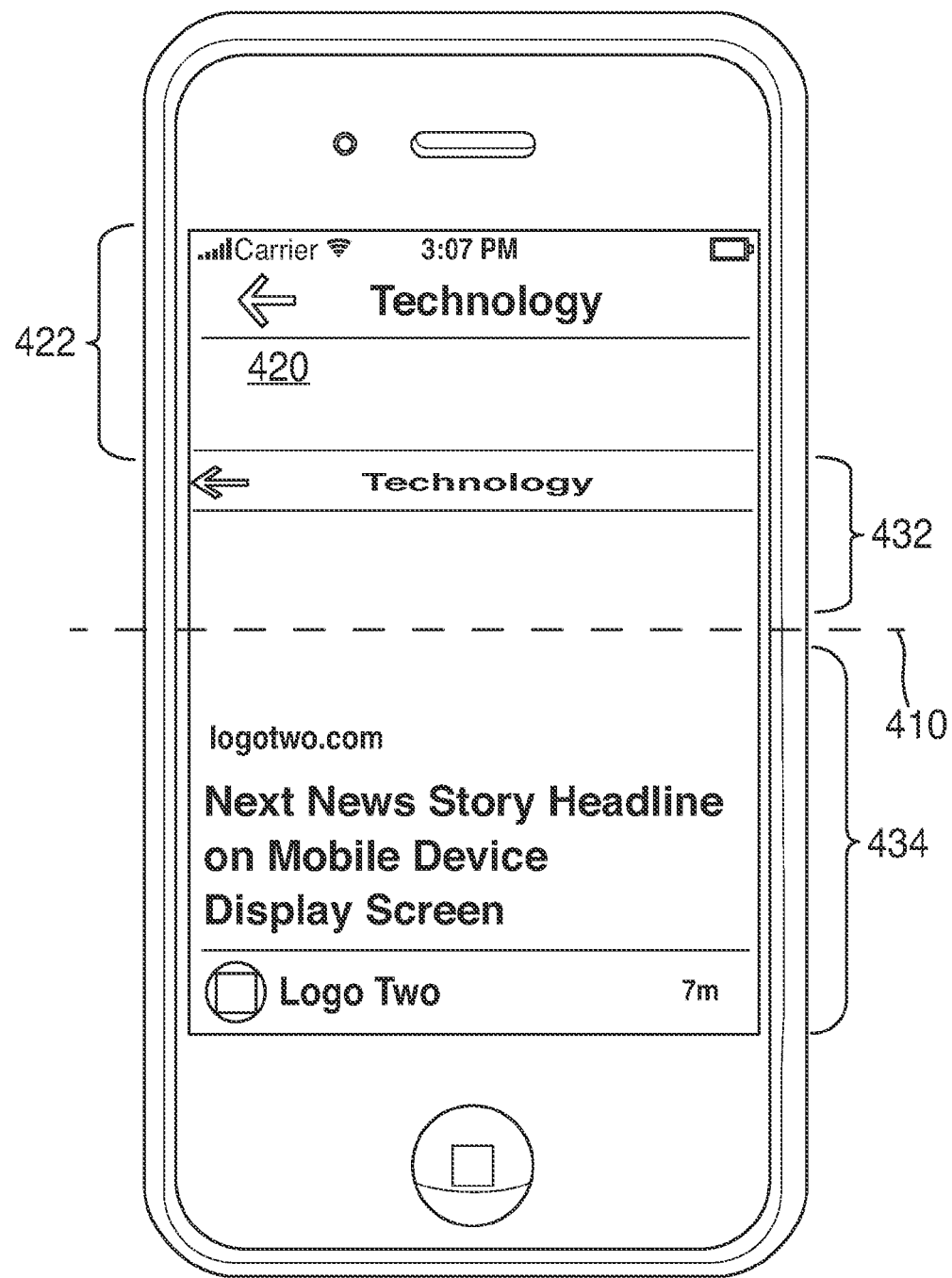
Figure 4F:
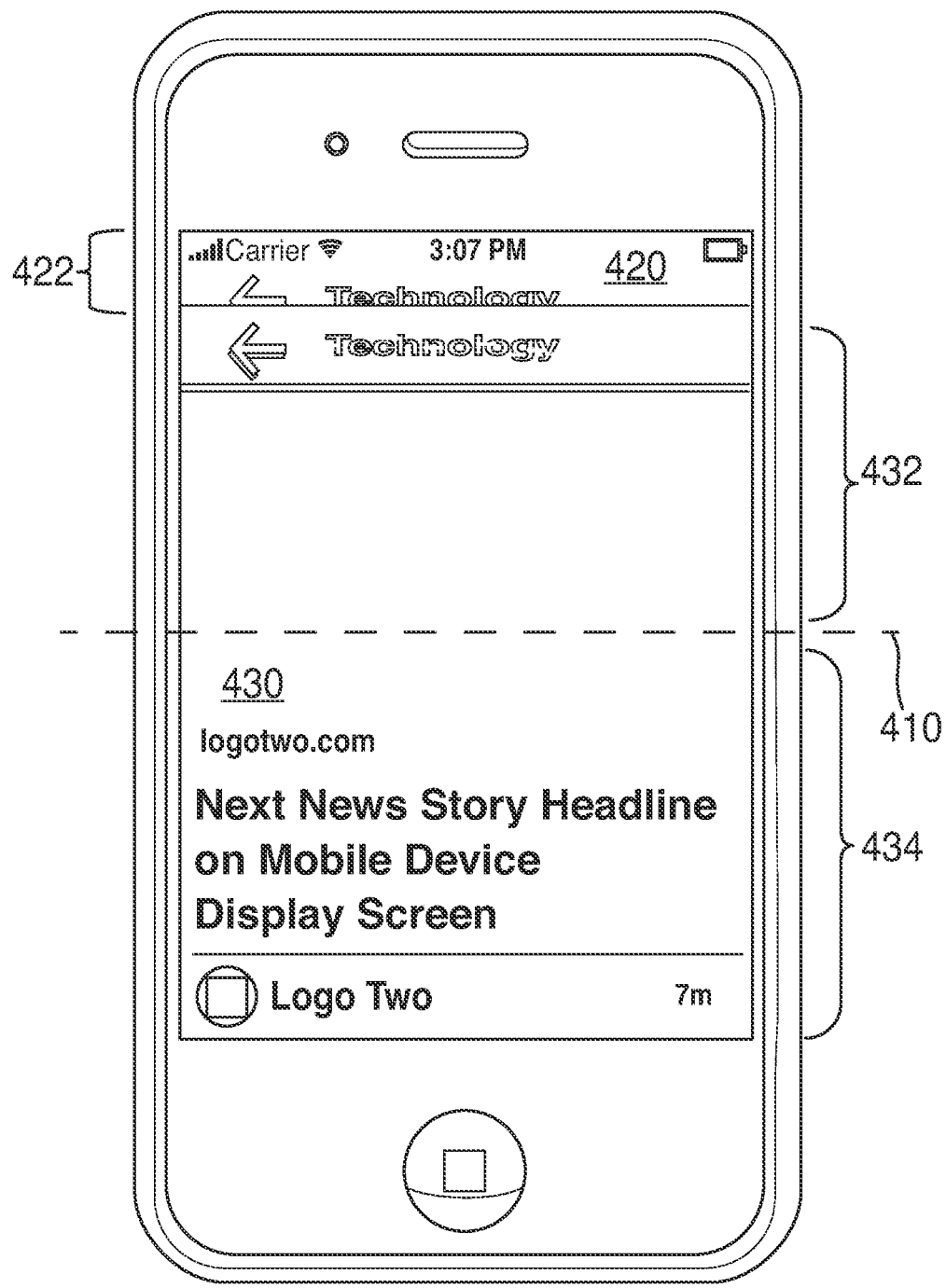
Figure 4G:
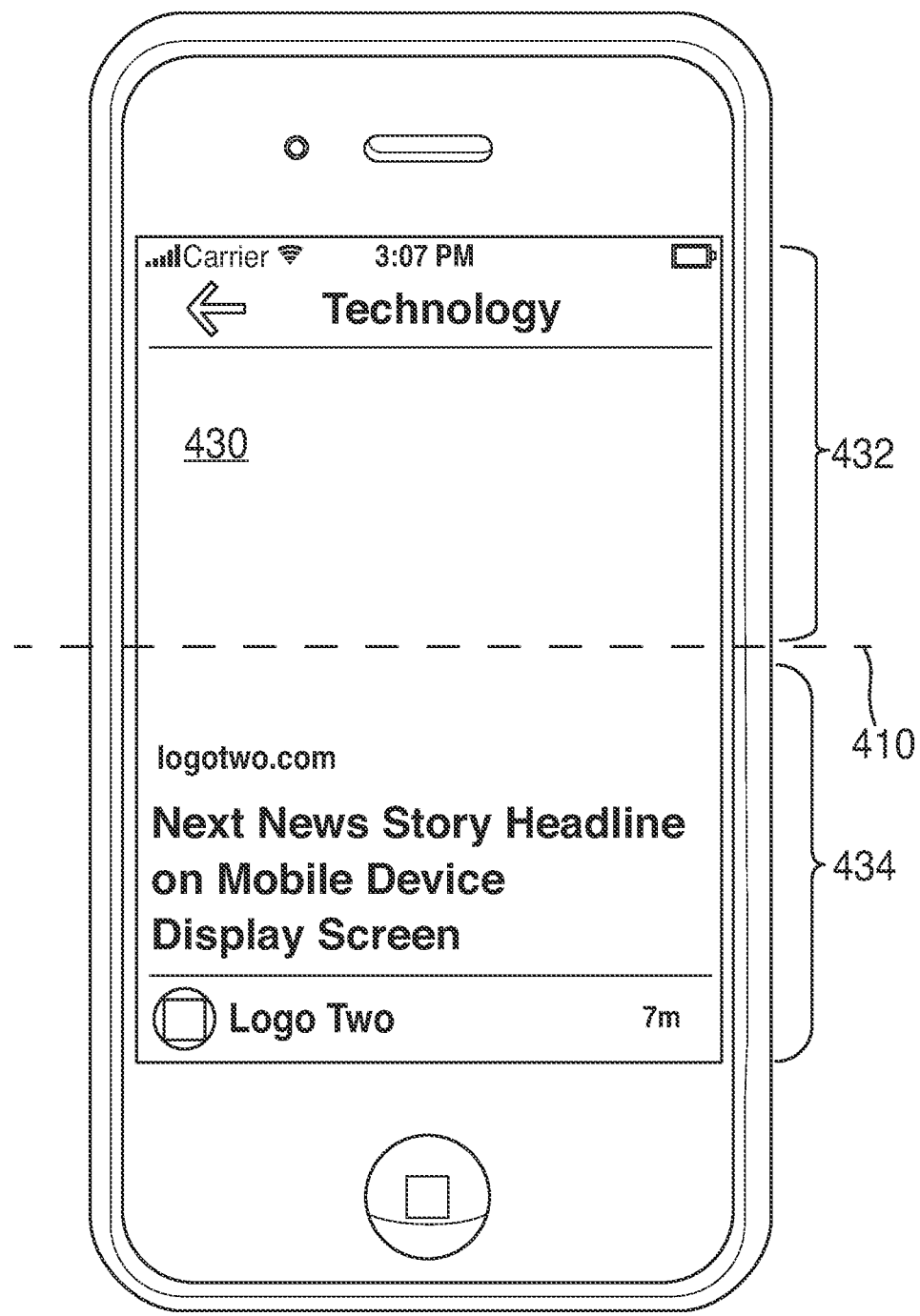

FIG. 4A shows a full view of page 420. FIG. 4B shows half 424 lifting off to reveal half 434. FIG. 4C shows half 424 further along in its flight path to the top half, but not yet having crossed flip axis 410. FIG. 4D shows half 424 at the halfway point in its flight path, fully revealing half 434. Any progression of half 424 beyond flip axis 410 results in having half 432 shown instead of half 424, as indicated by FIG. 4E. FIG. 4F shows how yet further progression of half 424 (not shown) covers more of half 422 and reveals more of half 432. FIG. 4G shows a full view of paged 430.

Although not shown in FIGS. 4A-G, lighting attributes of one or more visible halves may change throughout the animation sequence. For example, in FIG. 4B, halves 422 and 424 can be considerably brighter than half 434. Whereas in FIG. 4D the lighting attributes of halves 422 and 434 can be substantially the same.

FIG. 5 illustrates how pages are converted into animation elements for use in a flip transition animation in accordance with an embodiment of the invention. When a user initiates a flip transition animation, an inflight module (shown in FIG. 14) converts the pages into animation elements and adds animation layers such as lighting to the elements. The inflight module prepares not only the current page for a transition, but a predetermined number of pages existing before and after the current page. As explained above, the pages can exist in a sequence that the user can peruse in a backwards or forward manner. It is understood that depending on where within the page sequence the current viewed page exists, it may not be possible to prep a predetermined number of pages existing both before and after the current page. In such cases, the inflight module may prep as many pages as it can.

For purposes of the description accompanying FIG. 5, assume the current page is page N and that the pages are altered to be flipped in a vertical direction, thereby necessitating the creation of top and bottom halves of each page. As shown, each page has either a bottom or top identifier. If the user flips to the next page, page N+1 will be shown, or if the user flips to the previous page, page N−1 will be shown.

In response to a trigger event, which is some event that may require a flip transition, the inflight module prepares several pages by splitting each page into top and bottom halves. In addition, the inflight module "mates" the bottom half of a given page (e.g., page N) to the top half of an adjacent page (e.g., page N+1) using a fold layer (e.g., fold layer 510). Fold layer 512 "mates" the top half of page N to the bottom of page N−1. The fold layer can be used by the inflight module as a marker for determining which halves of which pages need to be animated as part of the transition animation. For example, when the user provides an input to flip to the next page, the inflight module determines which fold layer is associated with the bottom half of page N, and after determining the fold layer, it knows that page N+1 is the next page to bring into view as page N begins its flight path out of view, as indicated by the dotted line. Page N+1 is "tethered" to page N and effectively follows the same flight path of page N. Continuing the example, the user can initiate another flip transition to cause page N+2 (not shown) to be displayed. The inflight module determines which fold layer is associated with the bottom half of page N+1 and initiates the transition animation of pages N+1 and N+2.

As another example, when the user provides an input to flip to a previous page (e.g., from page N to page N−1), the inflight engine determines which fold layer is associated with the top layer of page N. After determining the fold layer, it knows to initiate a transition operation of pages N and N−1.

Lighting layers 520 can be layered on top of each half as shown. A lighting module (shown in FIG. 14) can generate lighting layers 520 and lighting attributes associated with each layer 520 can be dynamically adjusted during flight of the halves. The lighting attributes can be based on any number of different factors such as position of the pages, or more particularly, position of the halves of each page, the light source location, and the angle in which the electronic device is held.

The inflight module not only converts the pages into animation elements, it also handles the inflight characteristics of each flip transition animation. Inflight characteristics can include the speed of the transition, the physics of the transition, and the animation style. Some of the characteristics such as speed and physics of the transition depend on input gestures provided by the user. Other characteristics such as animation style are typically independent of user input gestures, but the speed in which the animation is executed can be user input gesture dependent.

Figure 6:
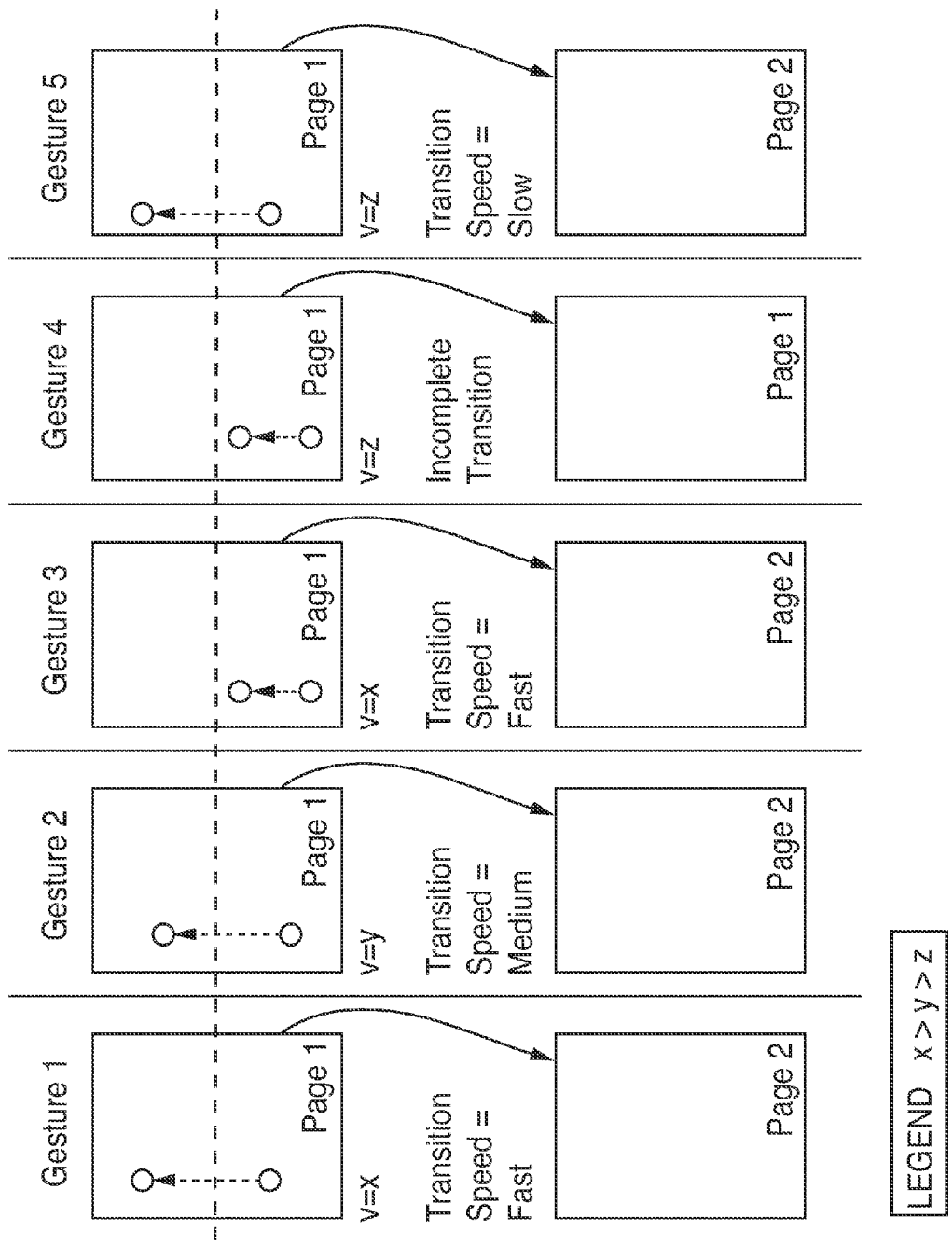
FIG. 6 shows several illustrative input gestures, with each gesture producing a different transition animation in accordance with an embodiment of the invention.

Referring now to FIG. 6, several illustrative input gestures are shown, with each gesture producing a different transition animation. Each of the input gestures is a swipe gesture, and a swipe gesture can include touchdown location (e.g., of a finger) on the device, drag time and speed across the screen, and liftoff location (e.g., of the finger) from the device. Each of these factors can determine the direction the user wishes to flip and whether the user intends to rapidly or slowly flip through the pages. As shown, each gesture has a touchdown location (as indicated by the lower circle), a drag path (as indicated by the dashed line), and a liftoff location (as indicated by the upper circle). Each gesture has a velocity of X, Y, or Z, where X>Y>Z.

The swipe gestures can be recognized by a touch hardware module that processes raw data received from a touch panel existing on the electronic device. The touch module can recognize other gestures such as taps (both single and multiple simultaneous taps) and multi-touch gestures (two-finger pinch or two-finger scroll). The touch module can work in concert with the inflight module and a physics module to determine inflight characteristics for a transition animation.

The physics module can calculate movement parameters of each transition animation based on the user input gesture. The physics module can determine how fast the inflight module should execute a transition animation. The physics module can determine whether the user input gesture was sufficient to enable the page to fully flip. For example, a user may "pick up" a page to flip it, but does not have enough velocity in her swipe gesture motion, and as a result, the page may lift off, but fall back down to the original position because there was not enough momentum to carry it over the flip axis.

The location of touchdowns and liftoffs can be determined using a polar coordinate system or a Cartesian coordinate system. In the polar coordinate system, the location is calculated with respect to the flip axis. The touchdown and liftoff location with respect to the flip axis provides more data points for the physics module to determine how to instruct the inflight module how to execute a transition animation. The following description of each gesture in FIG. 6 will illustrate how the physics module takes each of the above-identified factors into account when instructing the inflight module how to execute a transition.

Gesture 1 shows a swipe gesture crossing the flip axis at velocity X. Since X is a relatively fast velocity and the gesture crosses the flip axis, the transition animation from page 1 to page 2 can be executed at a relatively fast pace.

Gesture 2 shows a swipe gesture crossing the flip axis at velocity Y. Since Y is a relatively medium velocity and the gesture crosses flip axis, the transition animation from page 1 to page can be executed at a pace proportional to Y.

Gesture 3 shows a swipe gesture that does not cross the flip axis, but is executed at velocity X. The physics module can deduce that the user intends a fast flip because the gesture is short and fast even though the gesture does not cross the flip axis. As a result, the flip transition animation is executed at a relatively fast pace.

Gesture 4 shows a swipe gesture that does not cross the flip axis, and is executed at velocity Z, a relatively slow velocity. In response to this gesture, the physics module can deduce that there is not enough speed to carry the page over the flip axis. Thus, even though the page may lift off, it does not have enough momentum to complete a full transition. As a result, the page will fall back down and the transition remains incomplete.

Gesture 5 shows a swipe gesture that crosses the flip axis at velocity Z, a relatively slow speed. In response to this gesture, the physics module can instruct the inflight module to execute the transition slowly but enables it to fully complete. Even though the user gesture is relatively slow, she lifted off just beyond the flip axis, thereby allowing "gravity" to do the work of completing the transition.

The gestures illustrated in FIG. 6 are indicative of just a few of many different gesture/transition combinations that may be executed in accordance with embodiments of the invention. For example, a gesture can touchdown in the top half, be dragged up, and liftoff in the top half, and this will result in having the bottom half flip onto the top half. Thus, the direction of the flip is not necessarily dependent on the touchdown location.

Another gesture/transition combination that can be exercised in accordance with embodiments of the invention is a series of relatively high speed swipe gestures that cause a series of relatively high speed flip transitions to be executed. The resulting flip transition animations may be referred to herein as fast flips. The inflight module can execute the fast flips so that multiple pages are inflight simultaneously. For example, when a first page goes inflight and a second input gesture is received during flight of the first page, the second page goes inflight while the first page is still inflight. If a third input gesture is substantially immediately received, a third page goes inflight simultaneously with at least the second page. The first page may still be inflight in which case all three pages are simultaneously inflight. This sequence of fast flips can continue indefinitely in either direction until there are no more pages to display or the user ceases proving gesture inputs.

Although the fast flips can occur in a relatively rapid succession, and multiple pages can simultaneously be inflight, the user is provided with a succinct snapshot of at least a portion of each page before the next fast flip commences. This gives the user the ability to quickly "thumb" through the pages in a rolodex fashion and make snap judgments as to whether to further explore any of the pages she just viewed.

Figure 7:
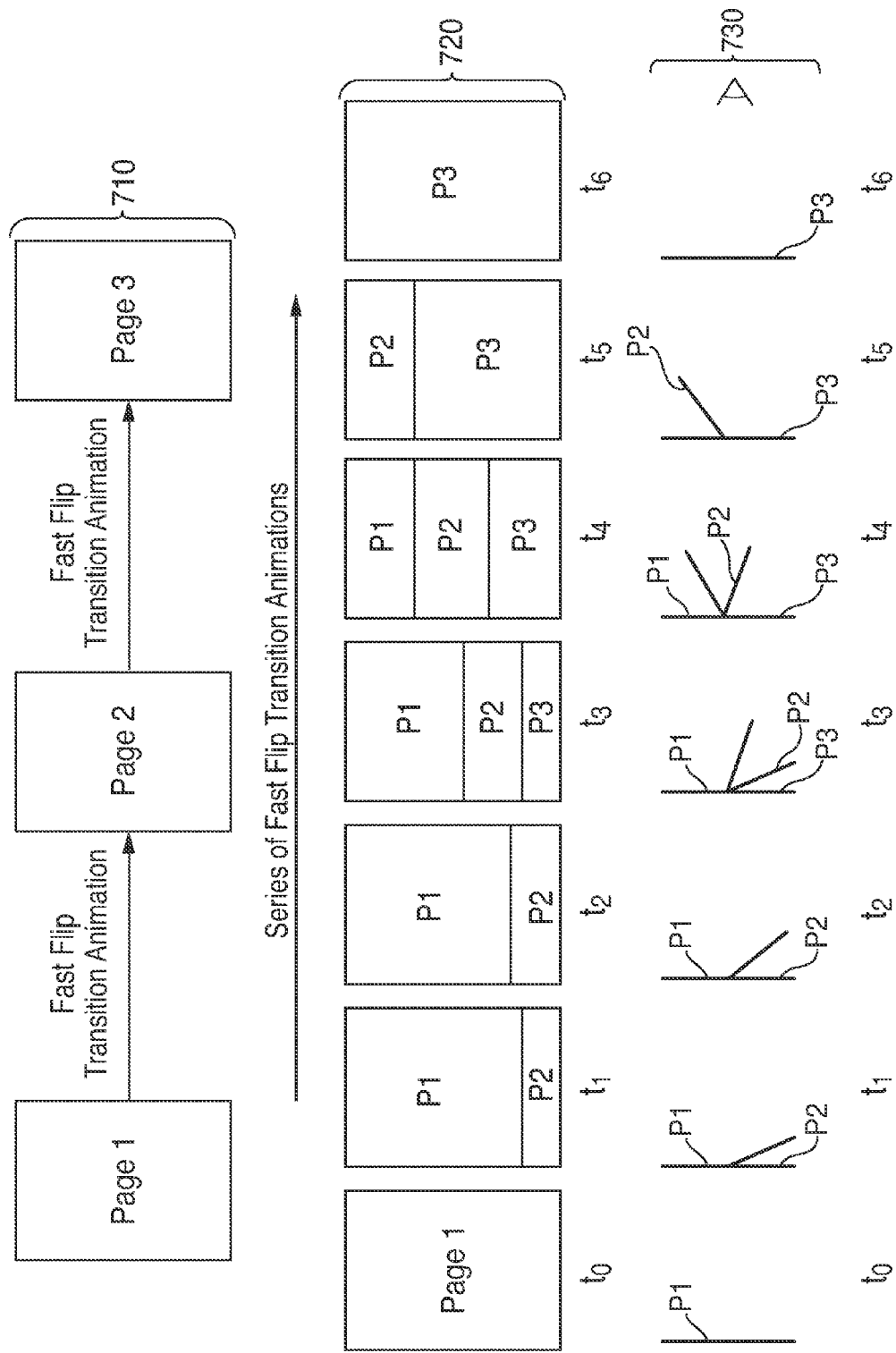
FIG. 7 shows an illustration of a series of fast flips in accordance with an embodiment of the invention.

Referring now to FIG. 7, an illustration of a series of fast flips according to an embodiment of the invention is shown. The series of fast flip transition animations begin with page 1, includes page 2, and ends with page 3, as illustrated by generic layer 710. The swipe gestures that initiate this series can be, for example, a series of the Gesture 3 type shown in FIG. 6. Each fast flip transition animation can take time ($T_{FF}$) to complete, where $T_{FF}$ is a predetermined period of time. The entire series of fast flips can take time (TS), which can depend on, among other factors, the number of flips the user commences. The predetermined period of time, $T_{FF}$, can range between 0.1 seconds to 0.9 seconds, or more particularly between 0.2 seconds to 0.7 seconds, or between 0.3 seconds and 0.6 seconds, or between 0.4 and 0.5 seconds, or about 0.4 seconds. For purposes of illustrative discussion, assume the transition is a vertical transition taken along a flip axis running horizontally across the page. FIG. 7 also has top view layer 720 that shows a top view of the transition animation and side view layer 730 that shows a hypothetical side view of the transition animation. The numbers P1, P2, and P3 shown in each time slice of layers 720 and 730 illustrate the viewable portions of the pages.

Before any transitions commence, the user can view only page 1, as illustrated by timeslice $t_0$ of layers 720 and 730. Commensurate with timeslice $t_0$, a fast flip gesture is received, which prompts the inflight module to commence inflight operation of page 1. When page 1 goes inflight, it begins to flip about the flip axis, pulling page 2 along with it, as shown in timeslices $t_1$ and $t_2$. Then around timeslice $t_3$, another fast flip gesture input is received, which prompts the inflight module to commence inflight operation of page 2. Similar to page 1, when page 2 goes inflight, it begins to flip about the flip axis, pulling page 3 along with it, as shown in timeslices $t_{3-5}$. In timeslices $t_{3-4}$, however, both pages 1 and 2 are simultaneously inflight. In timeslice $t_5$, only page 2 is in flight because page 1 had finished its inflight execution. At timeslice $t_6$, only page 3 is visible and page 2 has finished its inflight execution.

FIGS. 8A-J illustrate a series of fast flip transition animations in accordance with an embodiment of the invention.

FIGS. 8A-J show flip axis 810 and pages 820, 830, 840, 850 to the extent any such portions thereof are visible. Page 820 has halves 822 and 824, page 830 has halves 832 and 834, page 840 has halves 842 and 844, and page 850 has halves 852 and 854. The appropriate halves are shown depending on the time slice of the animation sequence. Halves ending in "xx2" are top halves, and halves ending in "xx3" are bottom halves. Each of the fast flip transition animations is a bottom to top vertical flip.

Figure 8A:
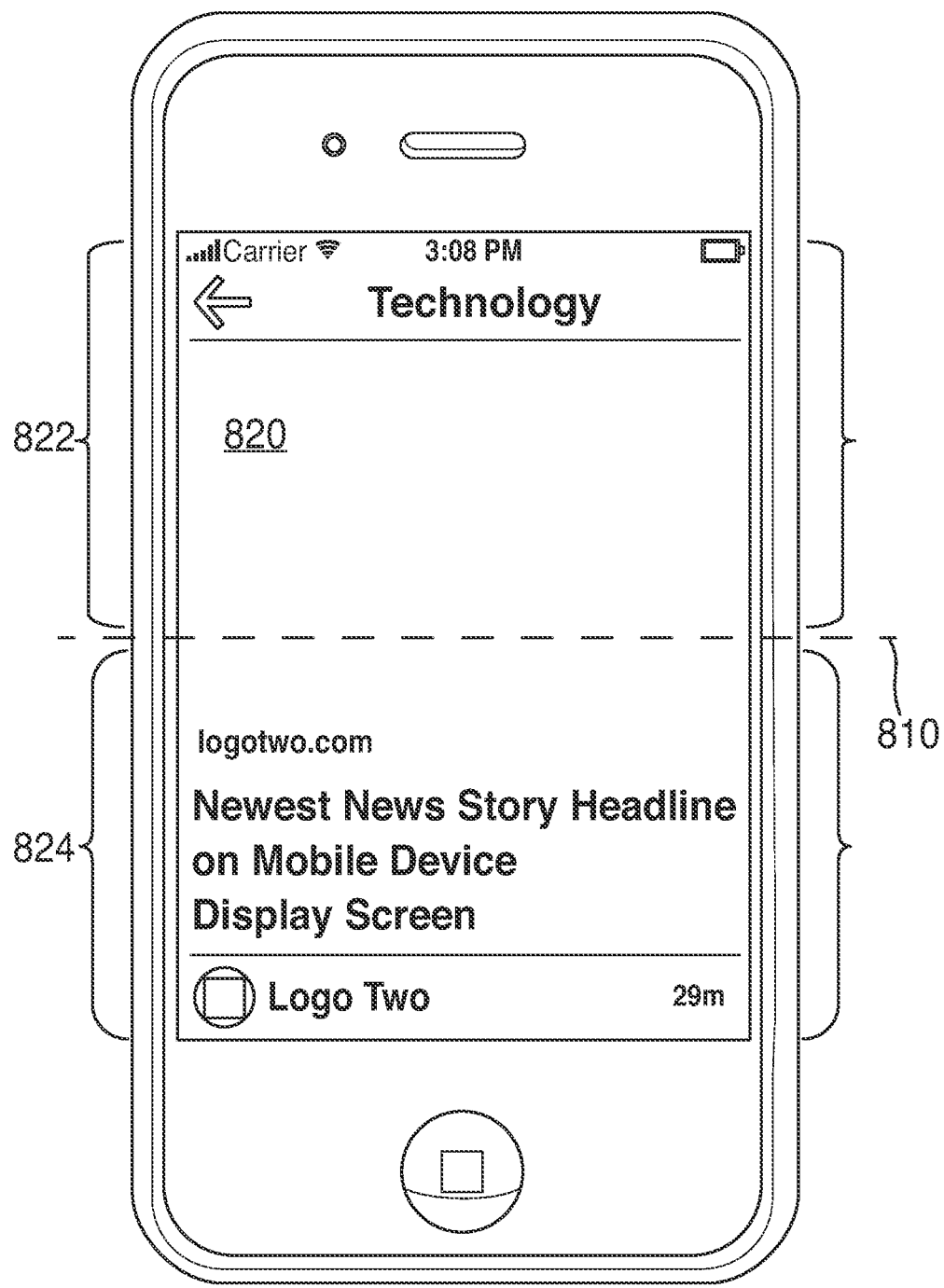
FIGS. 8A-J illustrate a series of fast flip transition animations in accordance with an embodiment of the invention.
Figure 8B:
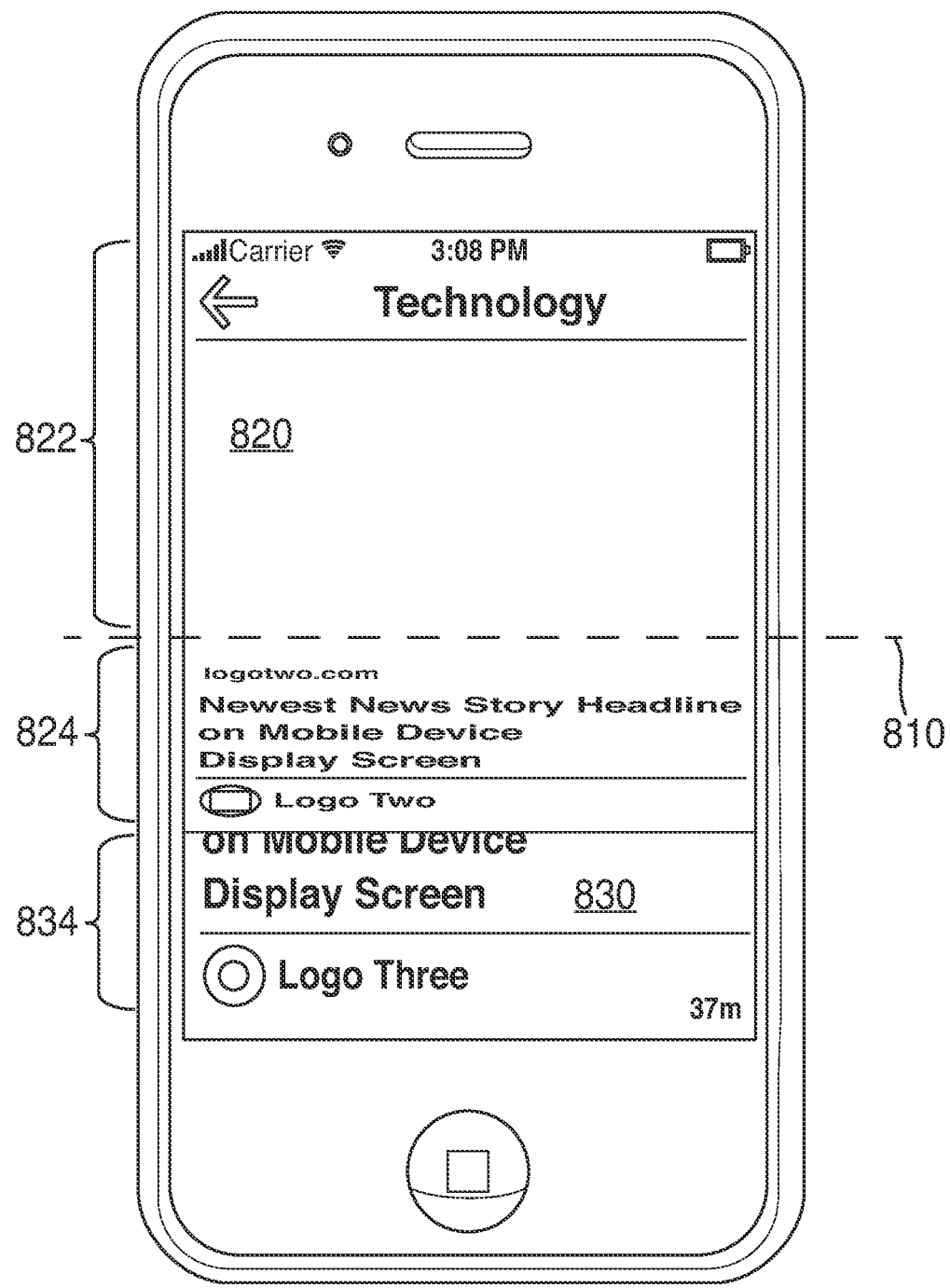
Figure 8C:
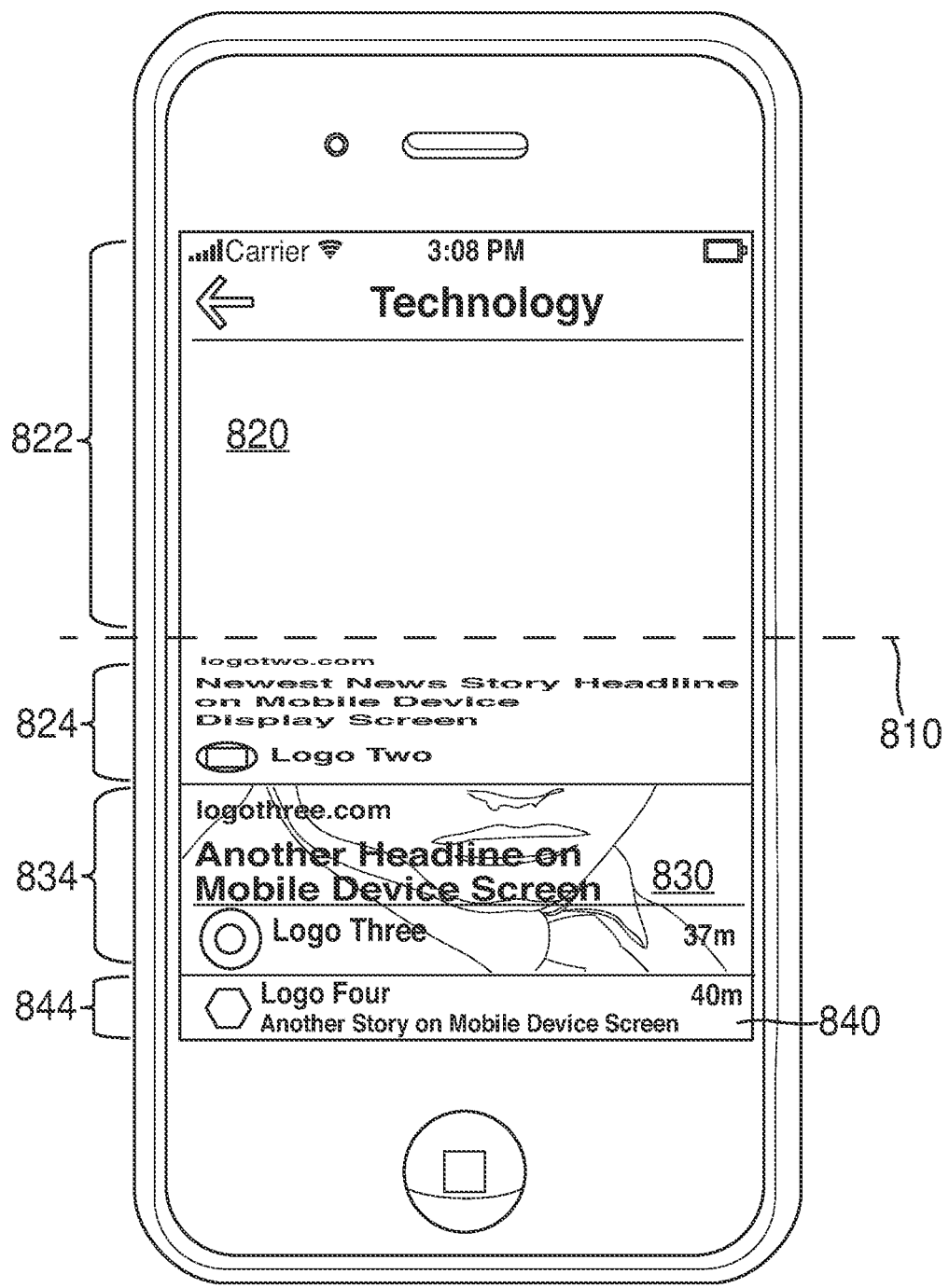

FIG. 8A shows a full view of page 820. FIG. 8B shows half 824 lifting off to reveal half 834. FIG. 4C shows half 424 further along in its flight path to the top half, but not yet having crossed flip axis 410. It also shows half 834 has lifted off to reveal half 844 of page 840. At this point in time, pages 820 and 830 are both inflight.

Figure 8D:
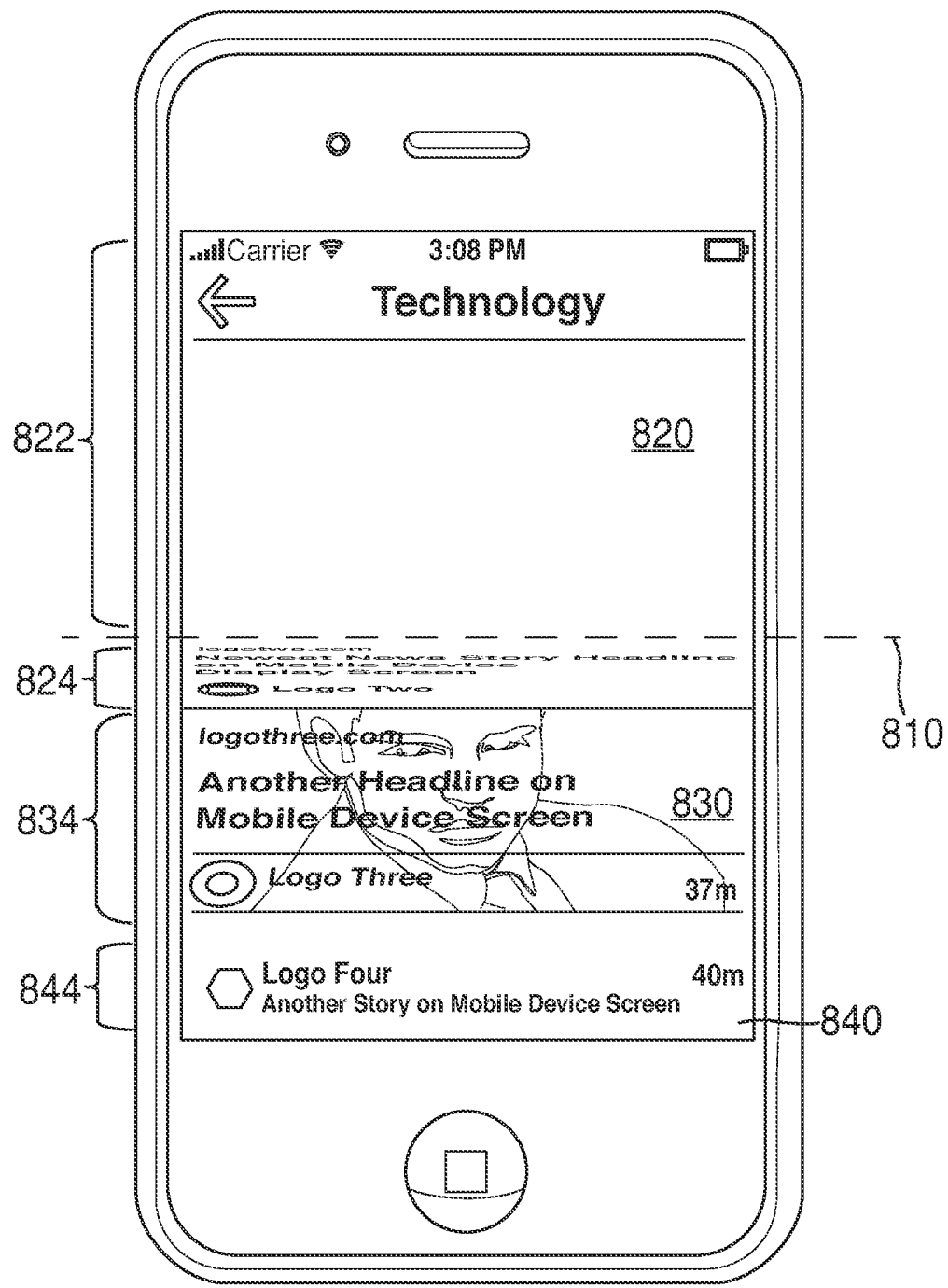
Figure 8E:
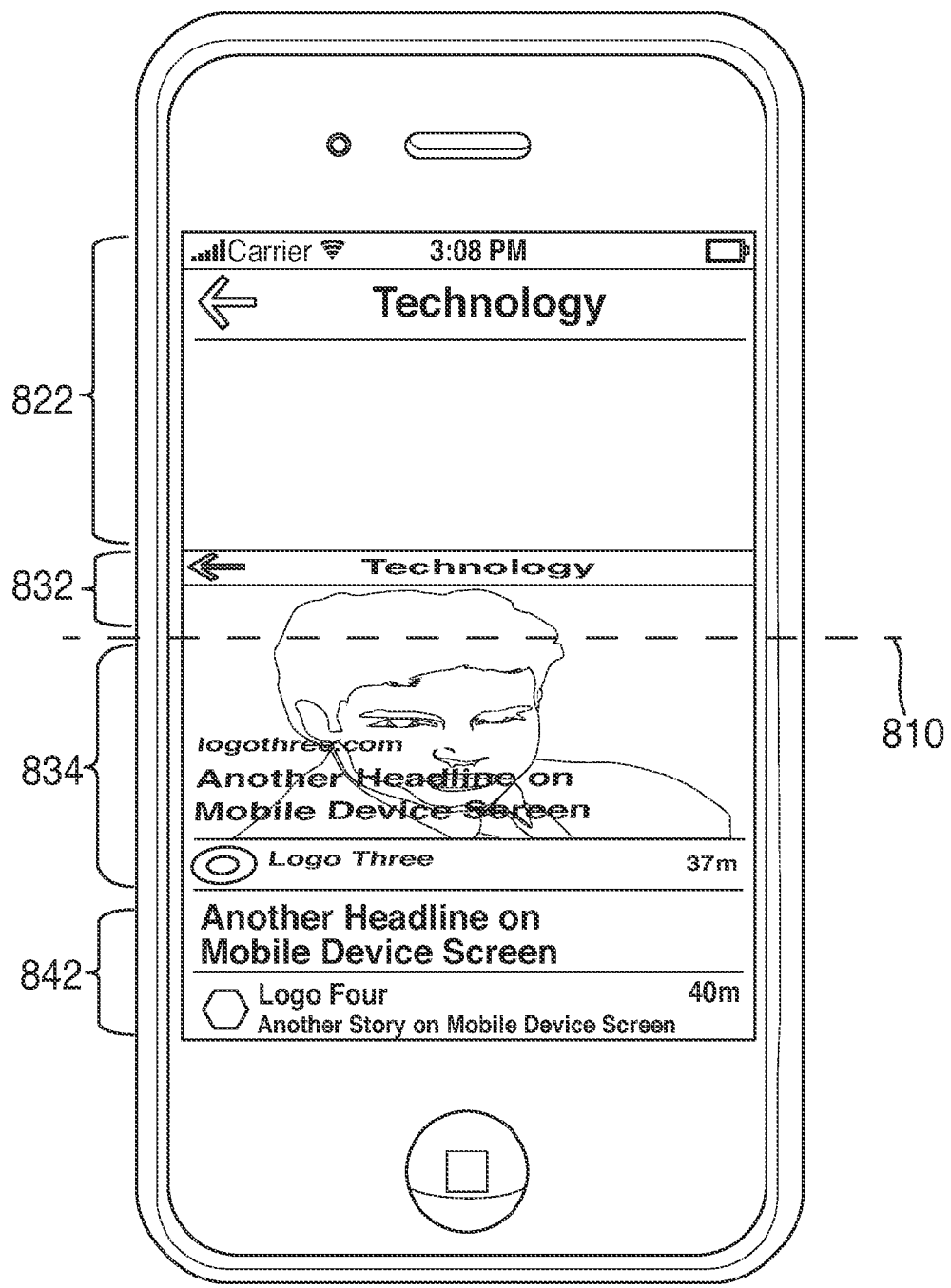

FIG. 8D shows that half 824 has nearly reached flip axis 810 and half 834 has progressed further along its flight path. FIG. 8E shows halves 822, 832, 834, and 844. Half 824 is no longer visible because page 820 has passed flip axis 810. Half 832 is now visible as a result of page 820 having passed flip axis 810.

Figure 8F:
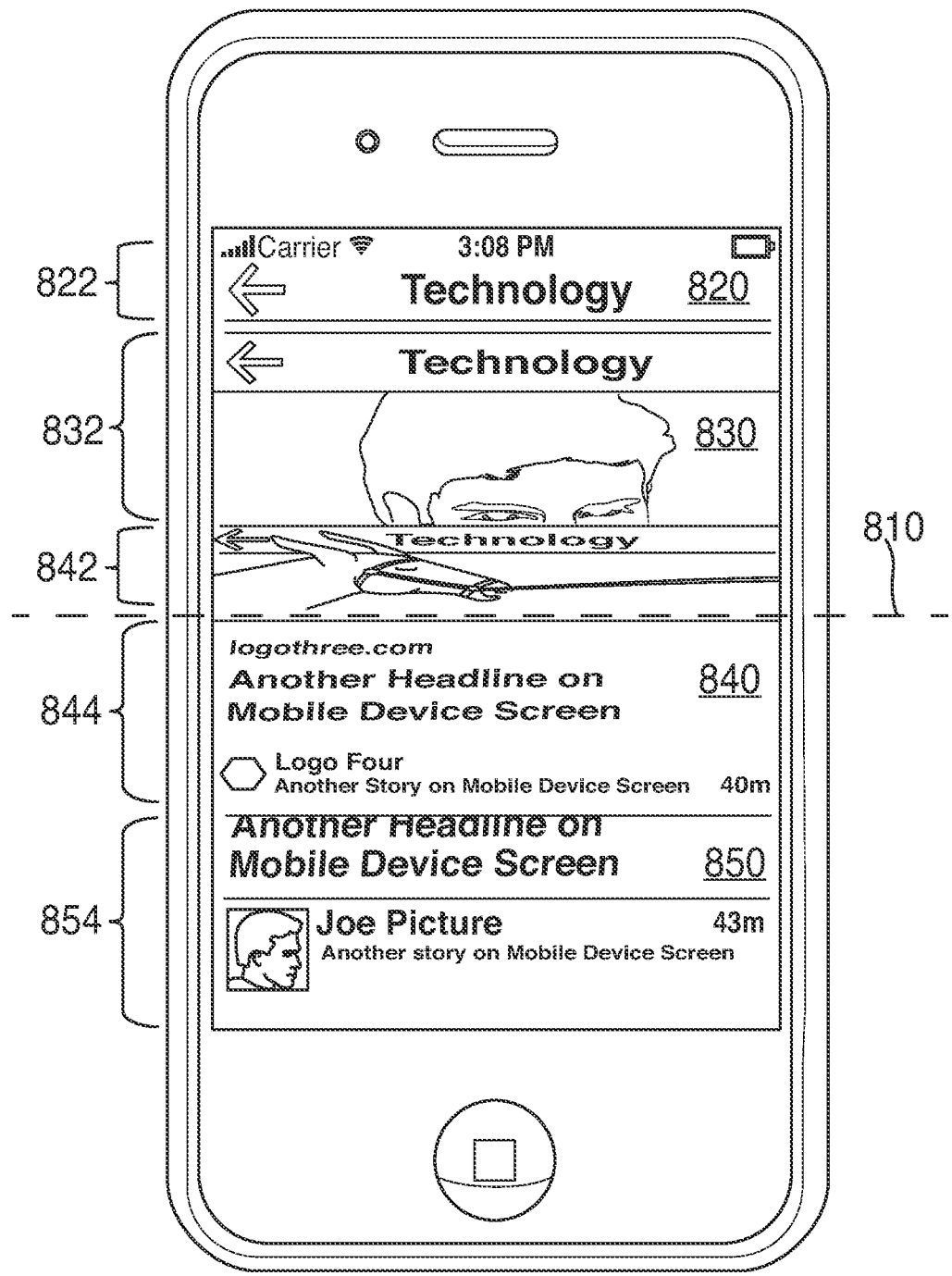
Figure 8G:
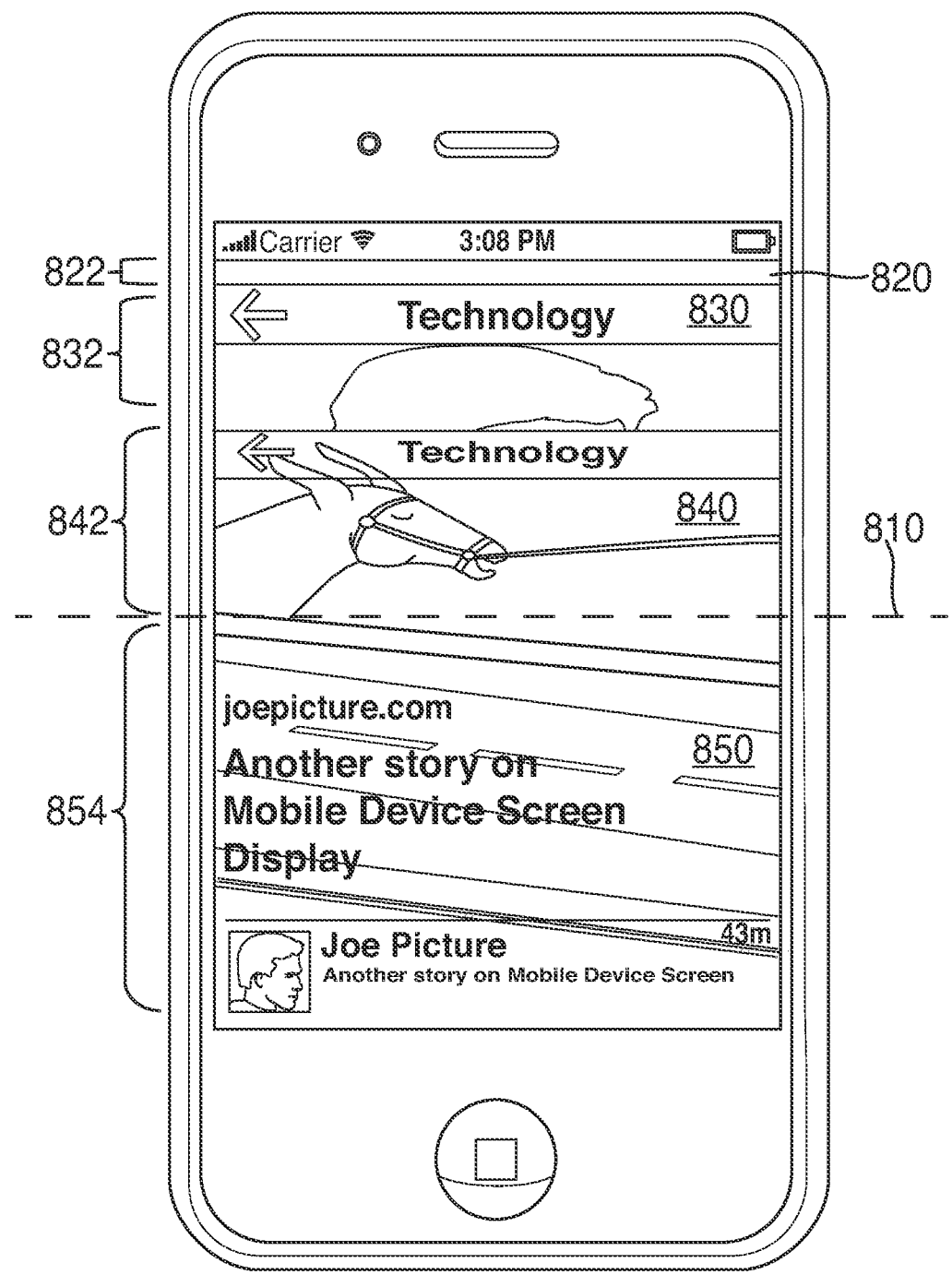
Figure 8H:
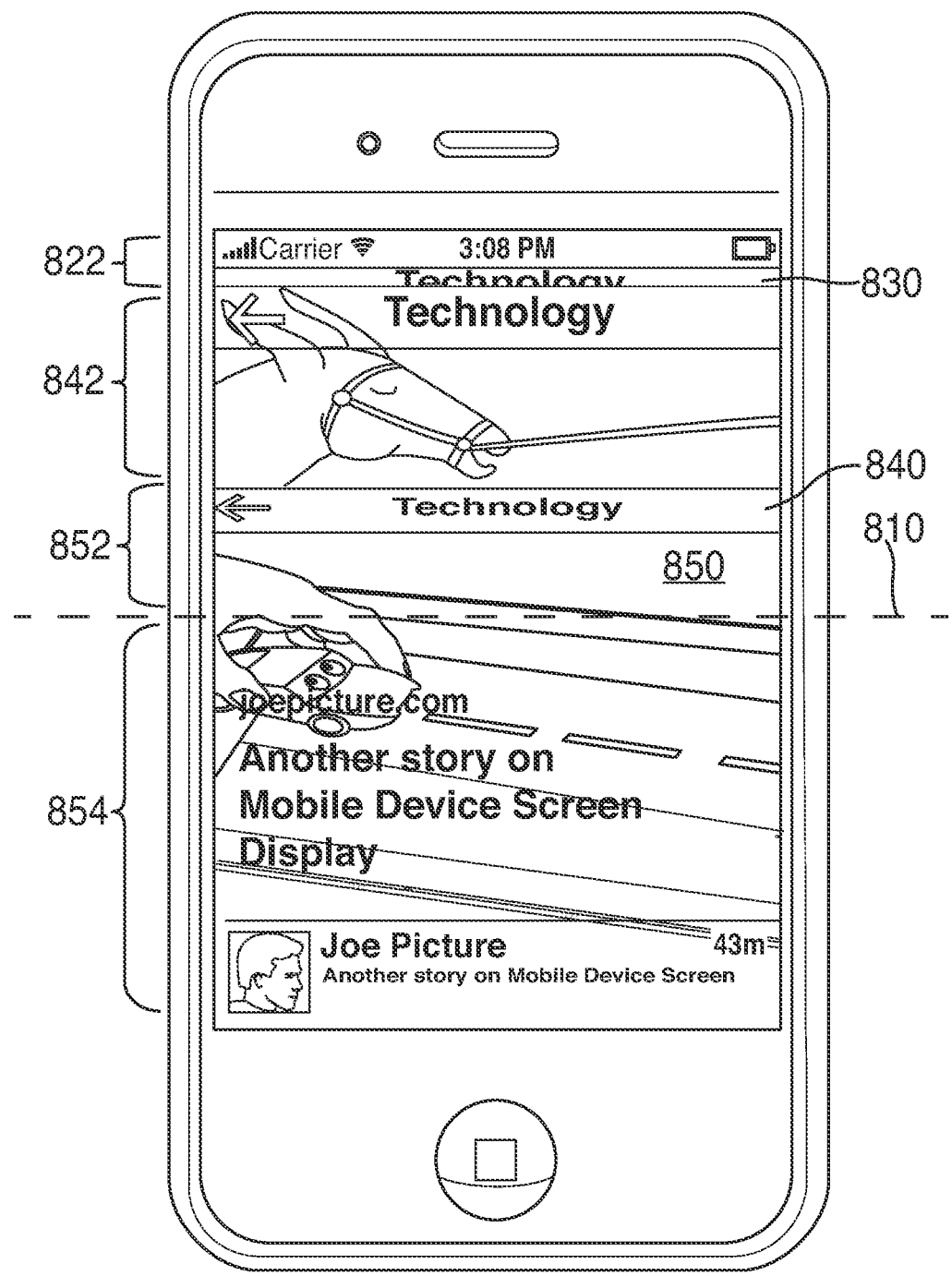

FIG. 8F shows pages 820, 830, and 840 all simultaneously inflight, with half 854 of page 850 being revealed. FIG. 8G shows that all of pages 820, 830, and 840 have passed flip axis, thereby showing only top halves 822, 832, and 842. FIG. 8H shows that page 820 (not shown) has finished its inflight execution because it is fully covered by page 830. FIG. 8H also shows that page 830 is nearing completion of its inflight execution and FIG. 8H also shows that page 840 has passed flip axis 810.

Figure 8I:
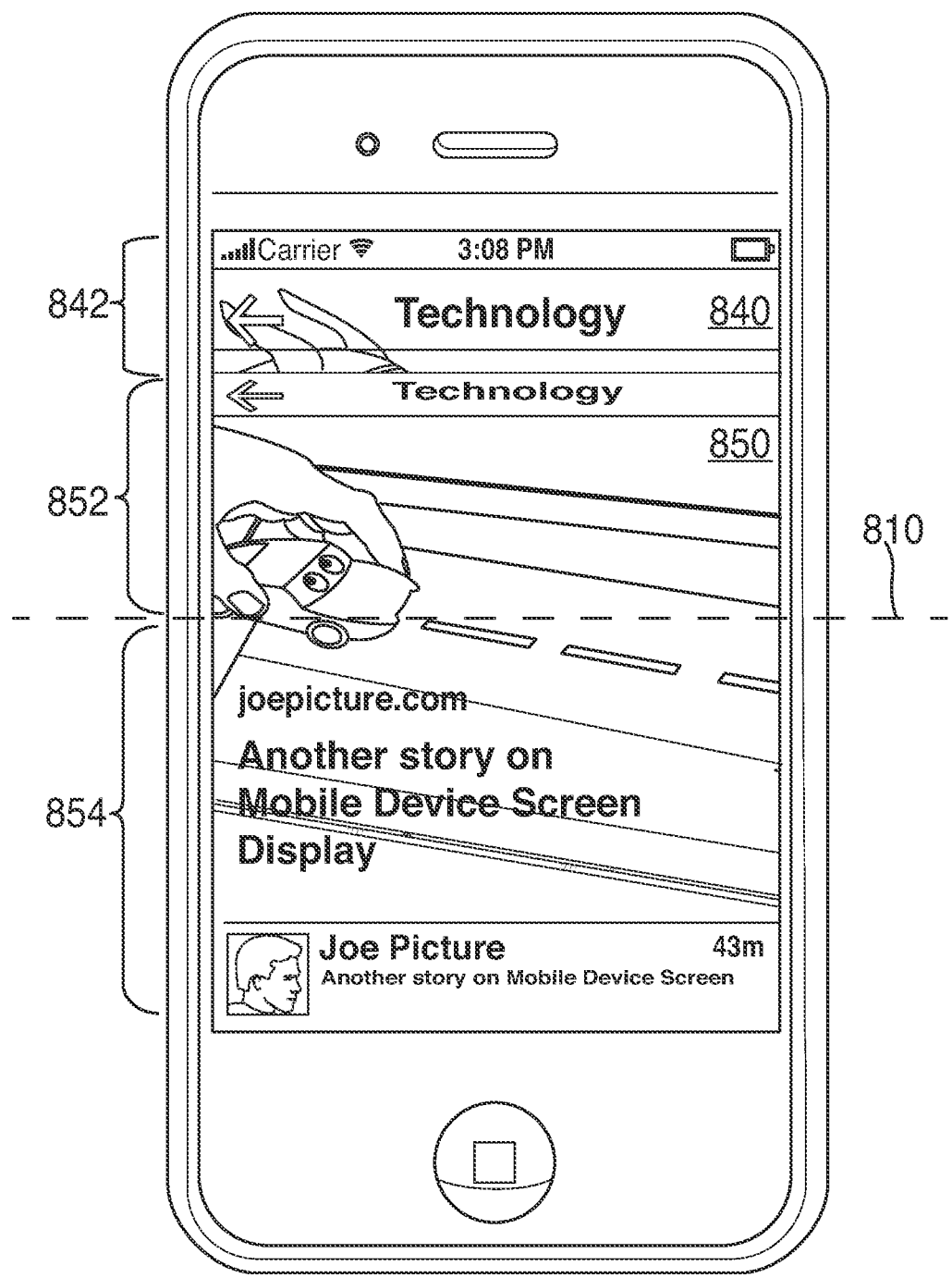
Figure 8J:
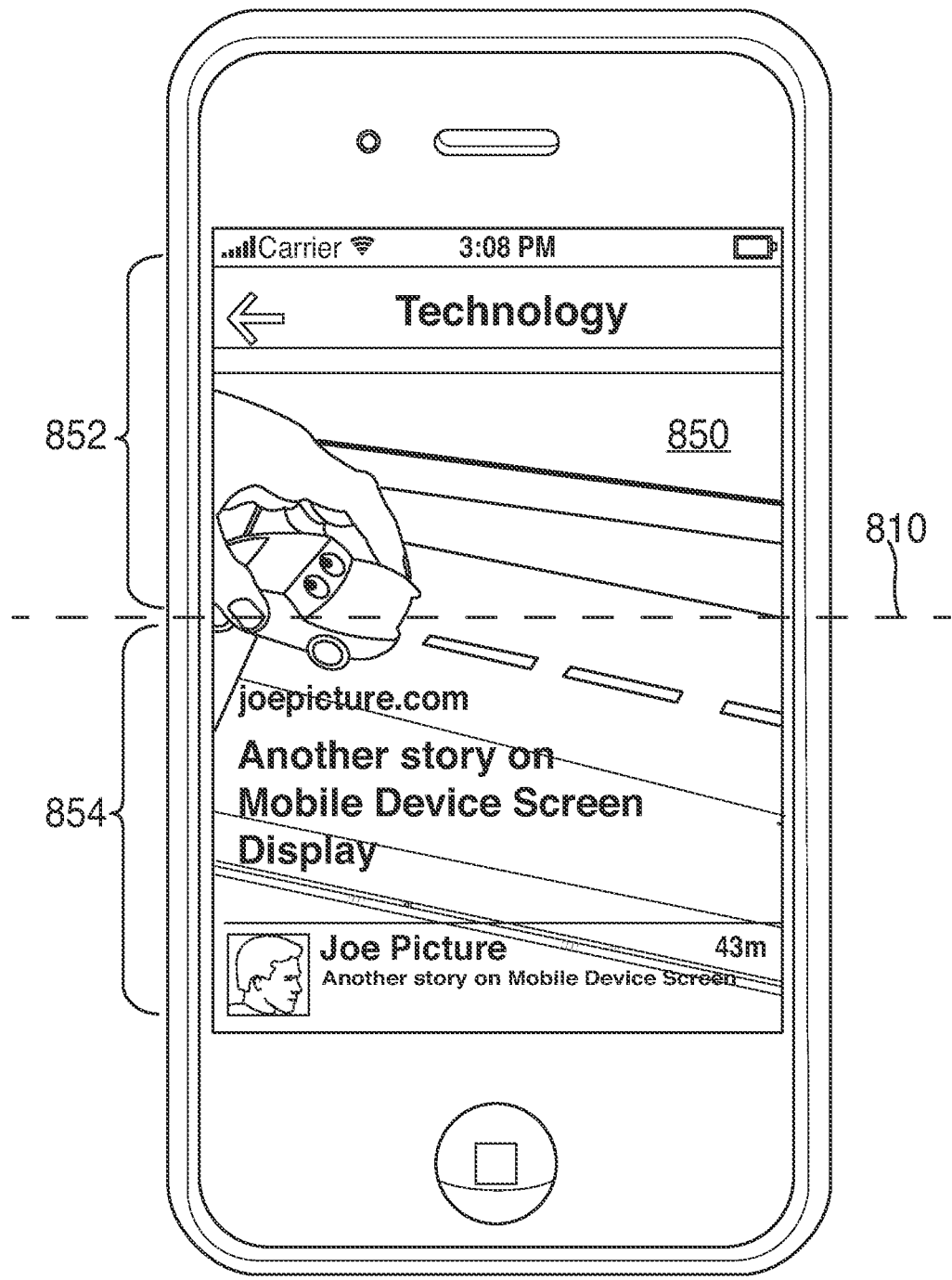

FIG. 8I shows pages 840 and 850, with page 840 nearing completion of its inflight path. In the next time sequence, shown in FIG. 8J, the inflight path for page 840 is complete because only page 850 is visible.

Figure 9:
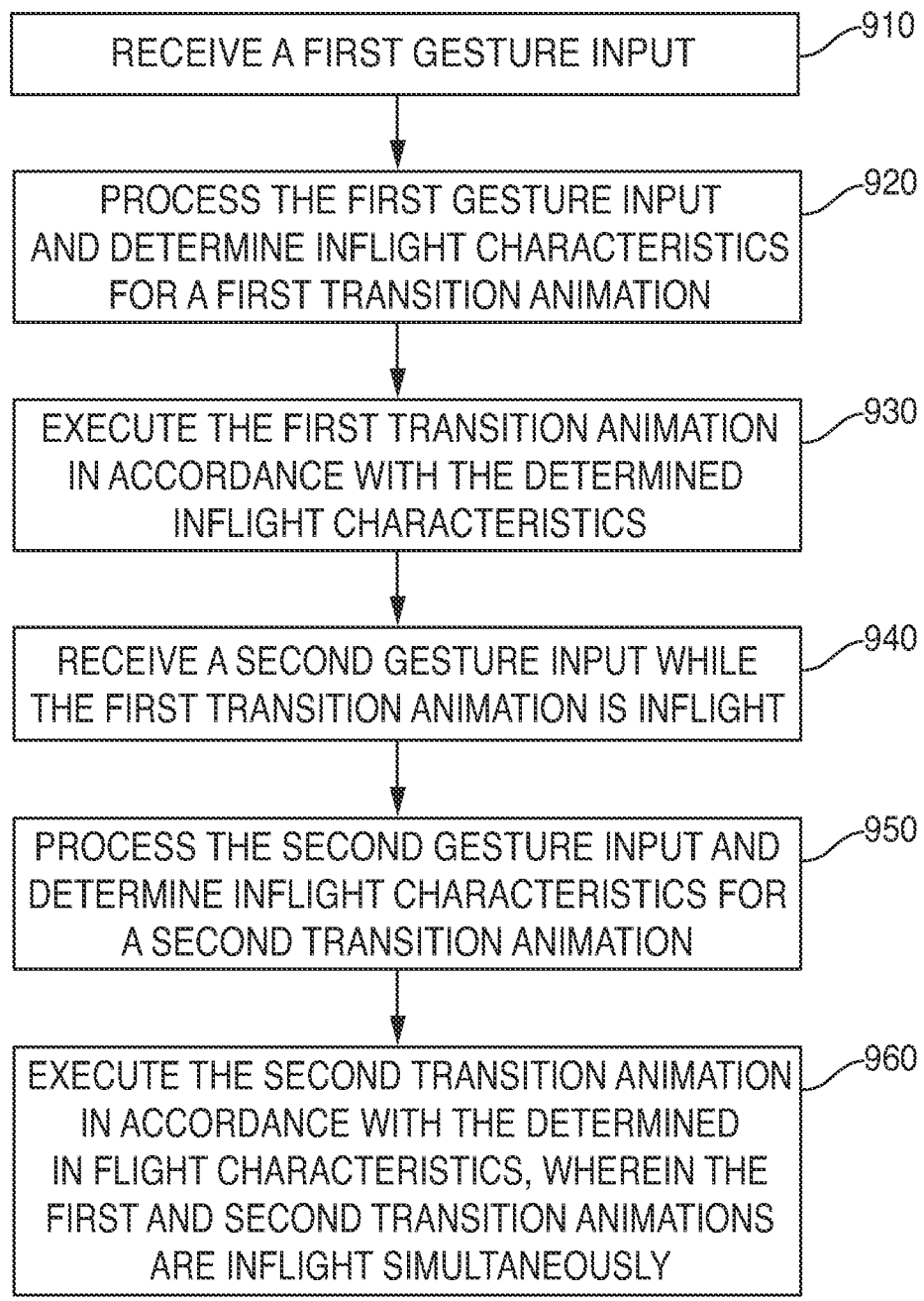
FIG. 9 shows an illustrative flowchart of steps for implementing a series of fast flip transition animations in accordance with an embodiment of the invention.

FIG. 9 shows an illustrative flowchart of steps for implementing a series of fast flip transition animations in accordance with an embodiment of the invention. Beginning at step 910, a first gesture input is received. The first gesture input can include characteristics (e.g., touchdown and liftoff locations and speed of drag) that can cause the inflight module to execute a fast flip transition animation. For example, a gesture input such as gesture 3 of FIG. 6 may be received. Alternatively, the first gesture can include characteristics that can cause the inflight module to execute a flip transition animation that progresses at a pace slower than a fast flip.

At step 920, the first gesture input is processed and inflight characteristics for a first transition animation is determined. The first gesture input may be processed, for example, by the physics module, the touch module, or a combination of both modules to determine the inflight characteristics of the first transition animation. The inflight characteristics dictate how the inflight engine executes the transition animation. As discussed above in connection with FIG. 6, the transition animation can be executed according to any number of different ways.

At step 930, the first transition animation is executed in accordance with the determined inflight characteristics. In this step, the inflight module controls the animation of a page and ultimately, how the animation is presented to a user by transmitting animation instructions to, for example, a 3D animation engine and/or graphics hardware. Moreover, the inflight module may prepare other pages for animation and use fold layers and lighting layers as appropriate.

At step 940, a second gesture input is received while the first transition animation is in flight. For example, as a first page is flipping over, the second gesture input is received. At step 950, the second gesture input is processed and inflight characteristics for a second transition animation are determined. For purposes of this discussion, assume the second gesture input is a fast flip gesture and the inflight characteristics are determined as such.

At step 960, the second transition animation is executed in accordance with the determined inflight characteristics, and as a result both the first and second transition animations are simultaneously in flight. Thus, for at least a minimum period of time, both animations are presented to the user at the same time. It is understood that additional steps may be added and that various steps may be performed in any order or simultaneously.

Figure 10:
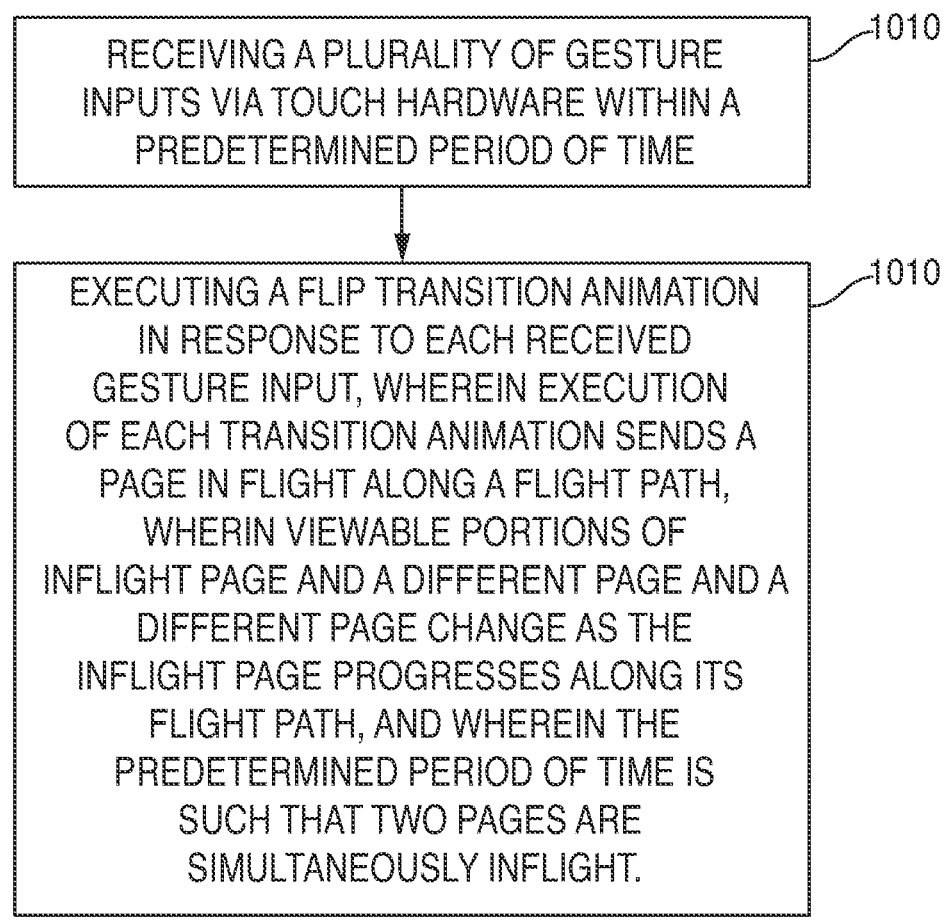
FIG. 10 shows another illustrative flowchart of steps for implementing a series of fast flip transition animations in accordance with an embodiment of the invention.

FIG. 10 shows another illustrative flowchart of steps for implementing a series of fast flip transition animations in accordance with an embodiment of the invention. Beginning at step 1010, a plurality of gesture inputs are received via touch hardware within a predetermined period of time.

At step 1020, a flip transition animation is executed in response to each received gesture input, wherein execution of each transition animation sends a page inflight along a flight path, wherein viewable portions of the inflight page and a different page change as the inflight page progresses along its flight path, and wherein the predetermined period of time is such that at least two pages are simultaneously inflight. Each transition animation displays at least a portion of a different page. That is, each time a new transition animation takes flight, a portion of a page "beneath" the inflight page(s) is presented to a user. In addition, because multiple gesture inputs are received relatively rapidly in sequence, at least two transition animations are simultaneously inflight. In some embodiments, three, four, five, six, or more transition animations may simultaneously be inflight.

Lighting parameters of each page can be dynamically adjusted depending on where a given page is within a given transition animation. This way, the user is presented with visual lighting effects for each visible page as she quickly flips through the pages.

Referring now to FIGS. 11A-J, an illustrative blank page multi-flip transition animation is shown. The blank page multi-flip transition animation is a transition animation similar to several fast flip transition animations except that the multi-flip transition includes several blank pages, whereas the fast flips include pages with content. The multi-flip animation, and in particular, the blank pages, signifies to the user that she is transitioning to a feature of the application that has several pages of content. The animation sequence of FIGS. 11A-J show a transition form a home screen to the first page corresponding to the category selected in the home screen. The multiflip transition animation can be handled by a multiflip module and can be performed automatically without user input. That is, the user may select a category, which prompts execution of the multiflip transition animation, but the sequence of multiple flip animations is performed automatically.

Figure 11A:
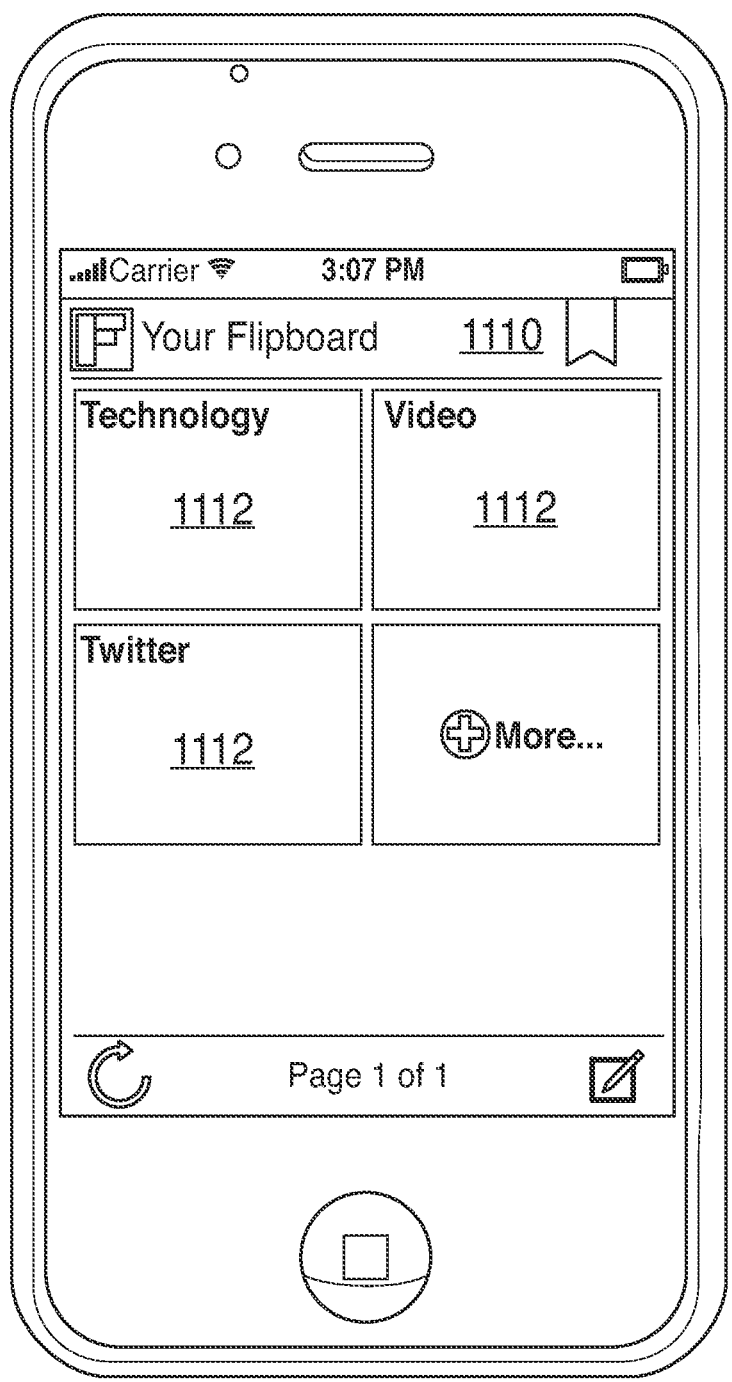
FIGS. 11A-J show an illustrative blank page multi-flip transition animation in accordance with an embodiment of the invention.
Figure 11B:
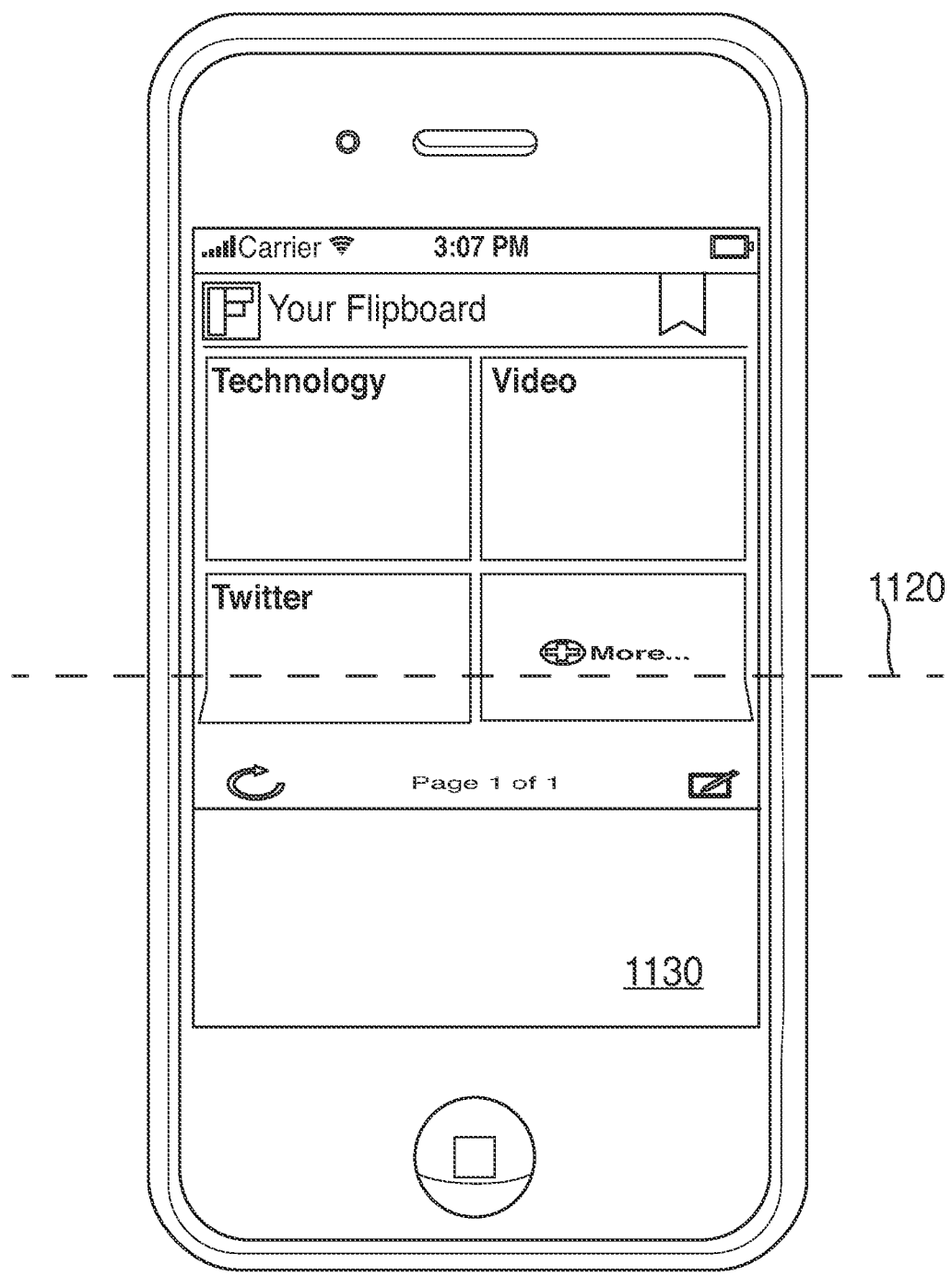
Figure 11C:
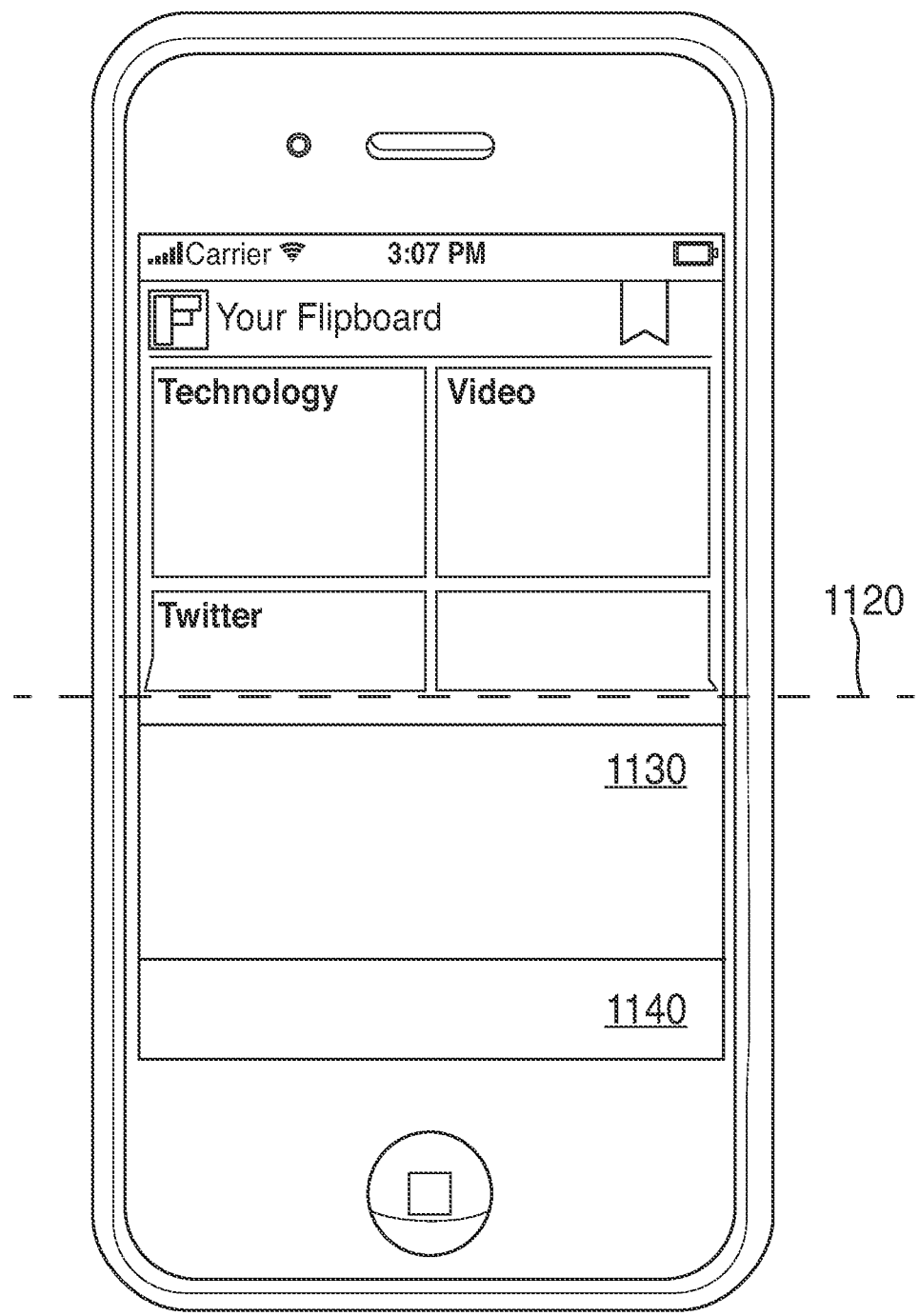
Figure 11D:
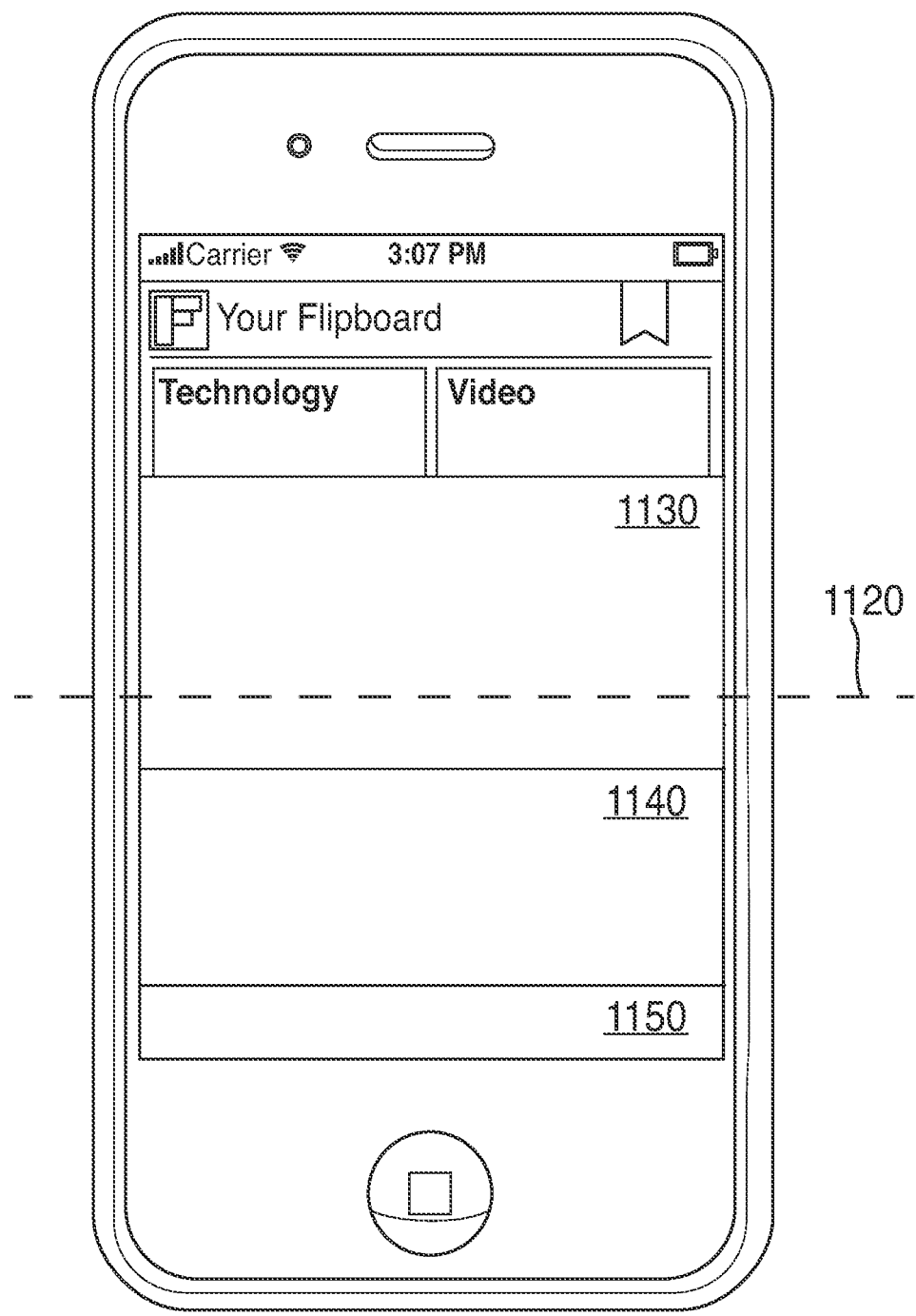
Figure 11E:
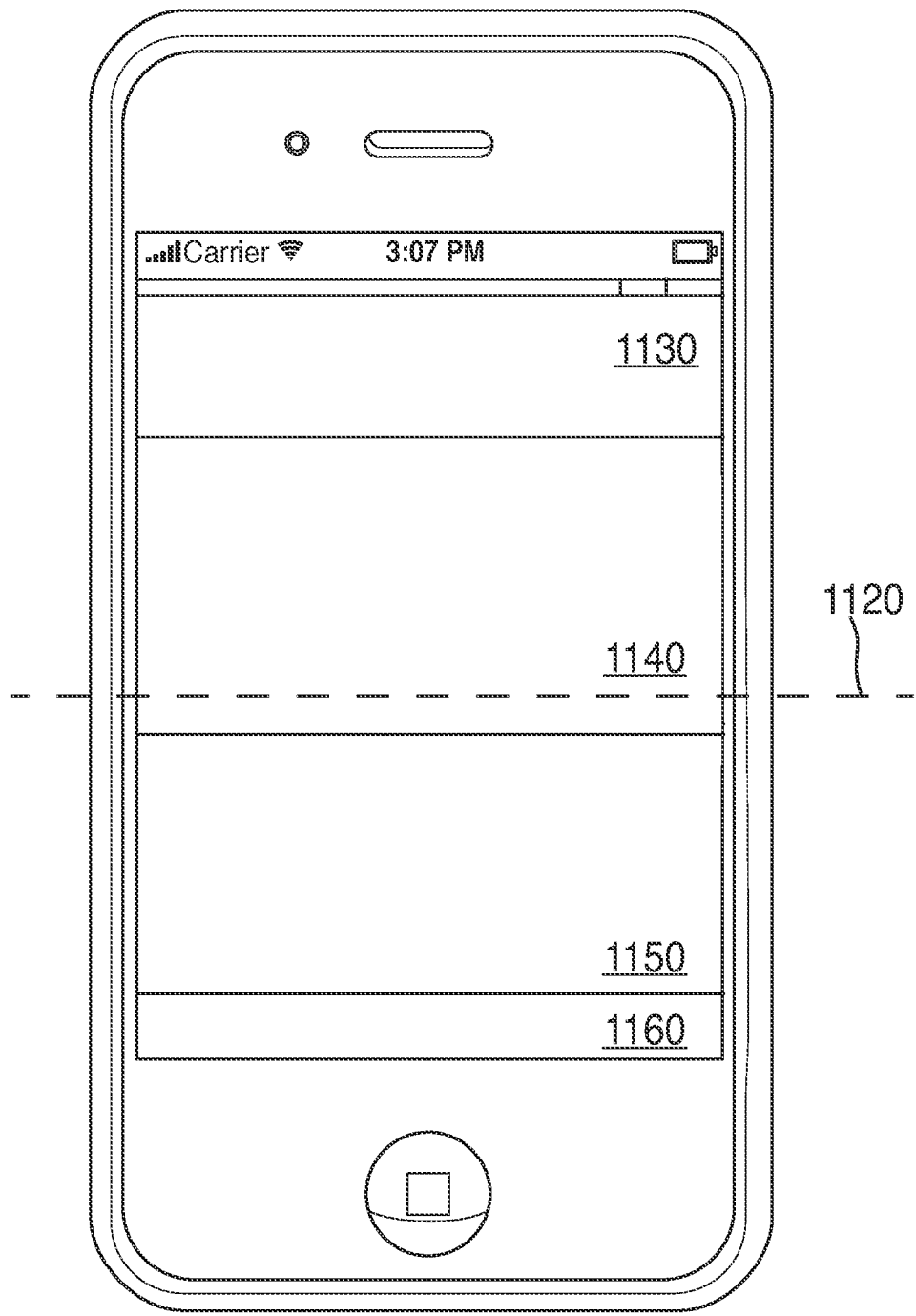
Figure 11F:
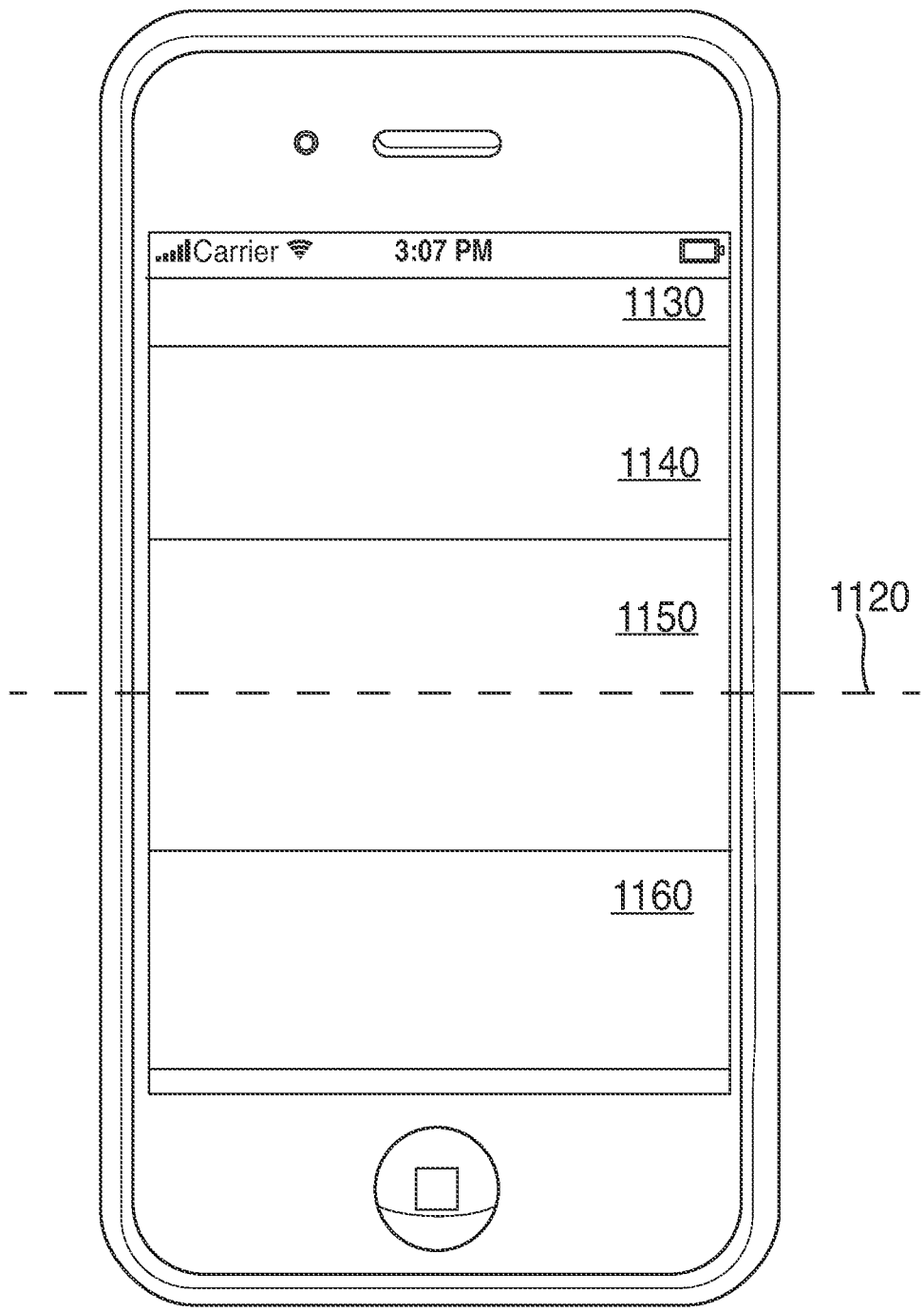
Figure 11G:
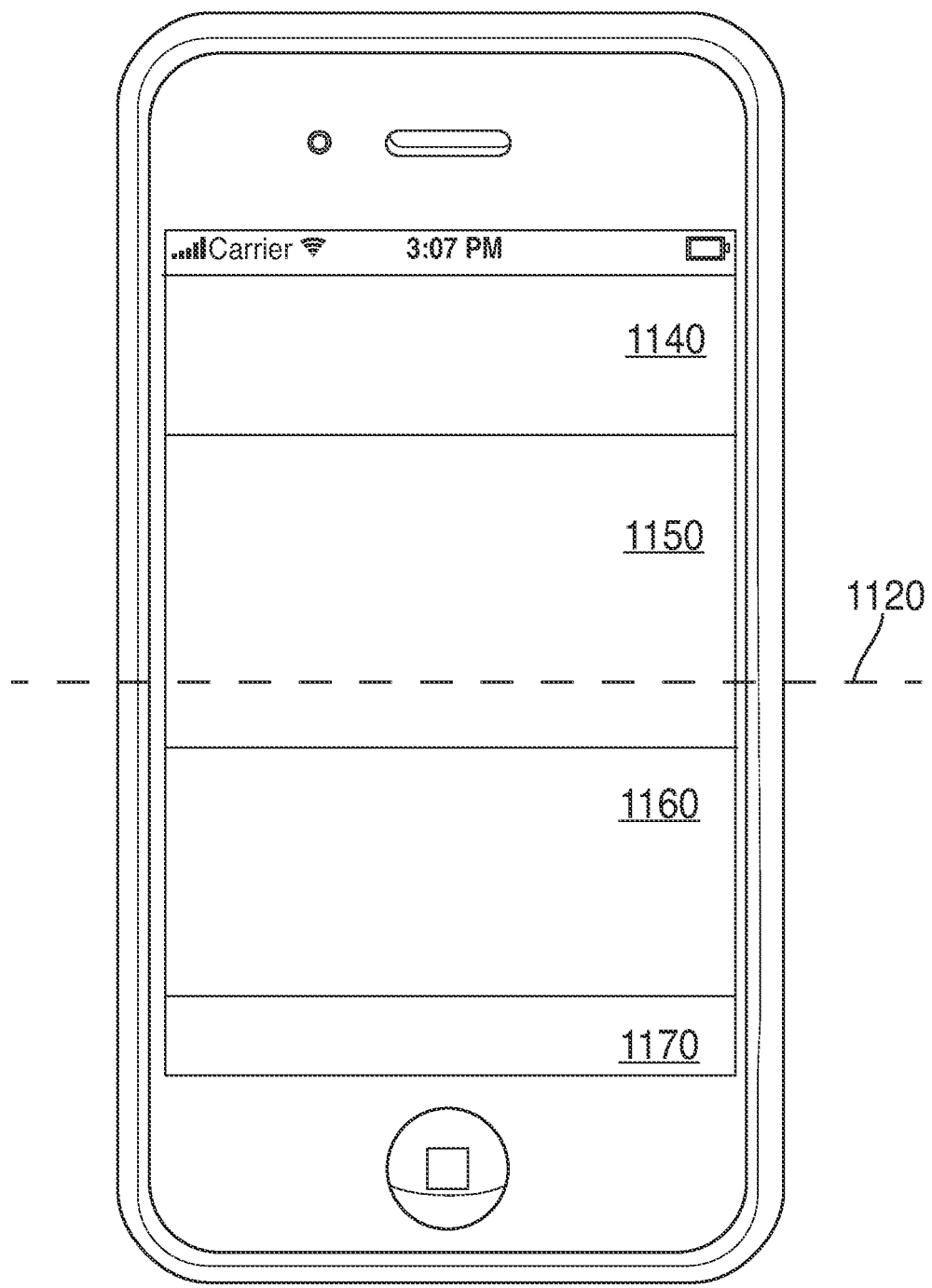

Beginning with FIG. 11A, a home screen 1110 is provided with several selectable categories 1112. Assuming a user selects one of selectable categories 1112, the home screen begins to flip about flip axis 1120, revealing first blank page 1130, as indicated in FIG. 11B. FIGS. 11C-G show a sequence of multiple blank pages flipping about flip axis 1120. The sequence includes blank pages 1130, 1140, 1150, 1160, and 1170, though it is understood that any number of blank pages may be used.

Figure 11H:
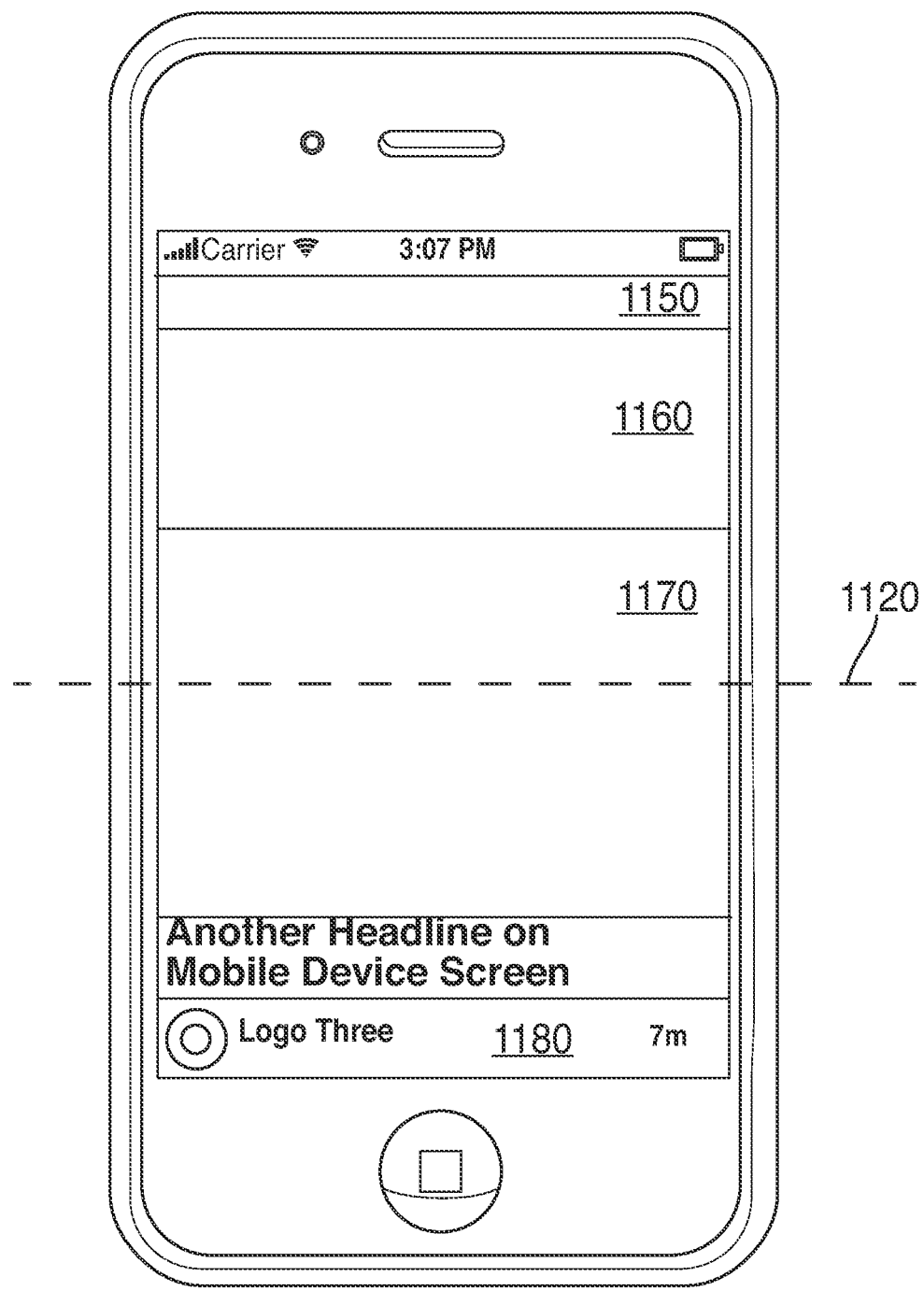
Figure 11I:
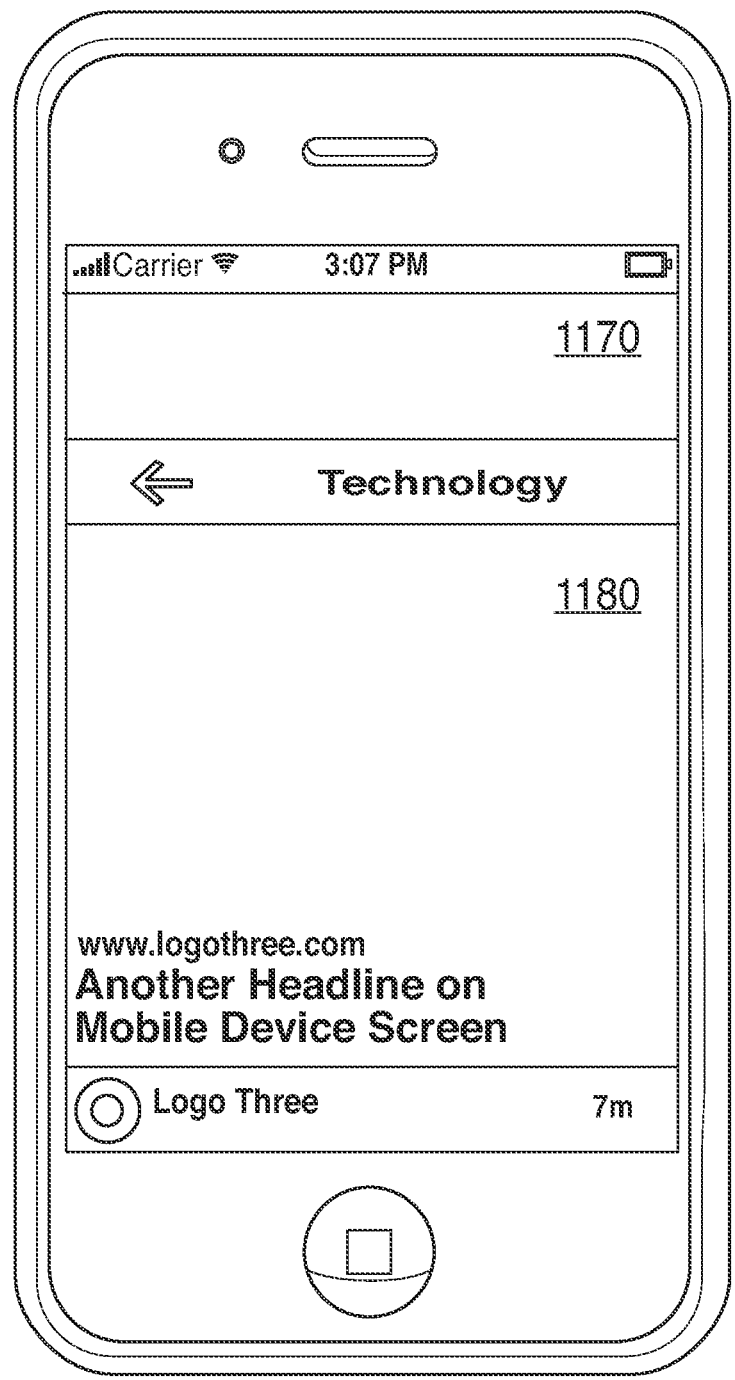
Figure 11J:
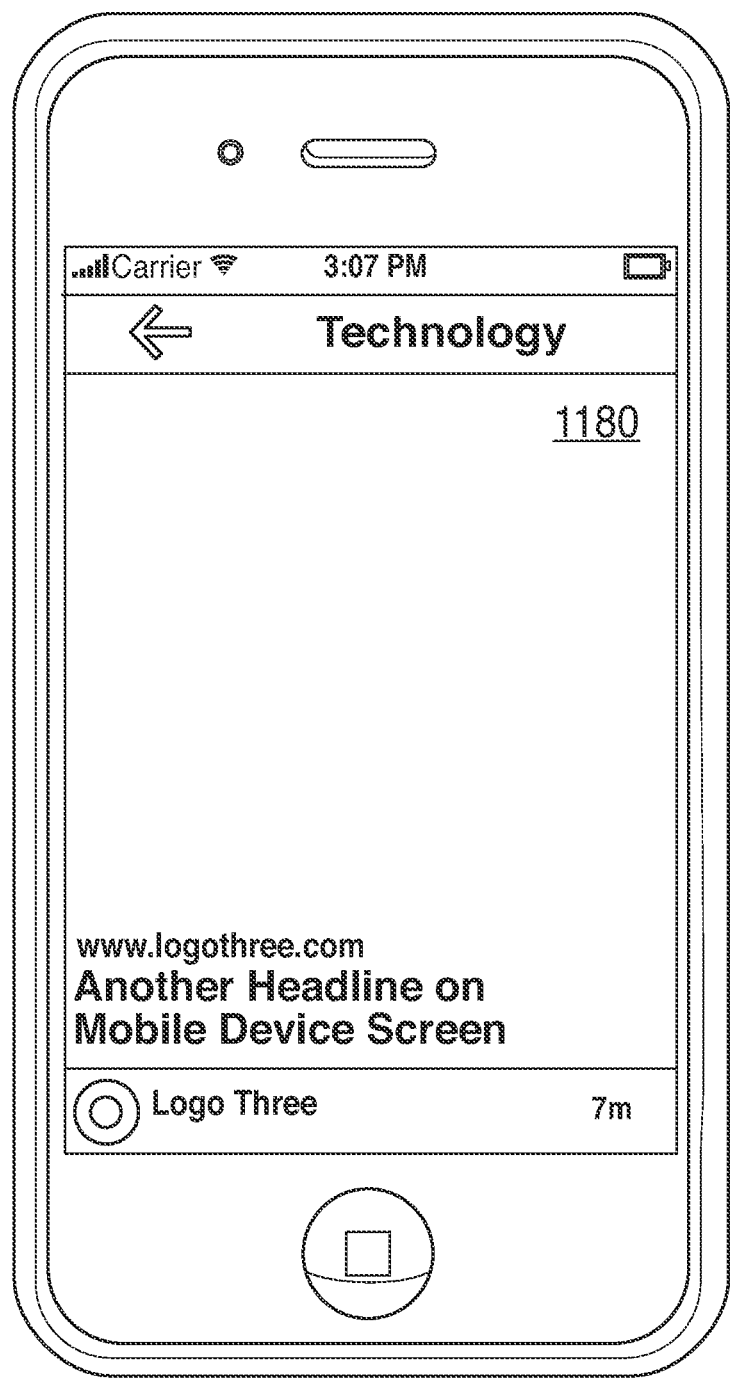

FIG. 11H shows that liftoff of blank page 1170 shows content page 1180. Content page 1180 may be the first page of all the available pages associated with the selected category. FIG. 11I shows that blank page 1170 is nearing its inflight path, and FIG. 11J shows that blank page 1170 has completed its inflight path because the user can see only content page 1180.

Figure 12:
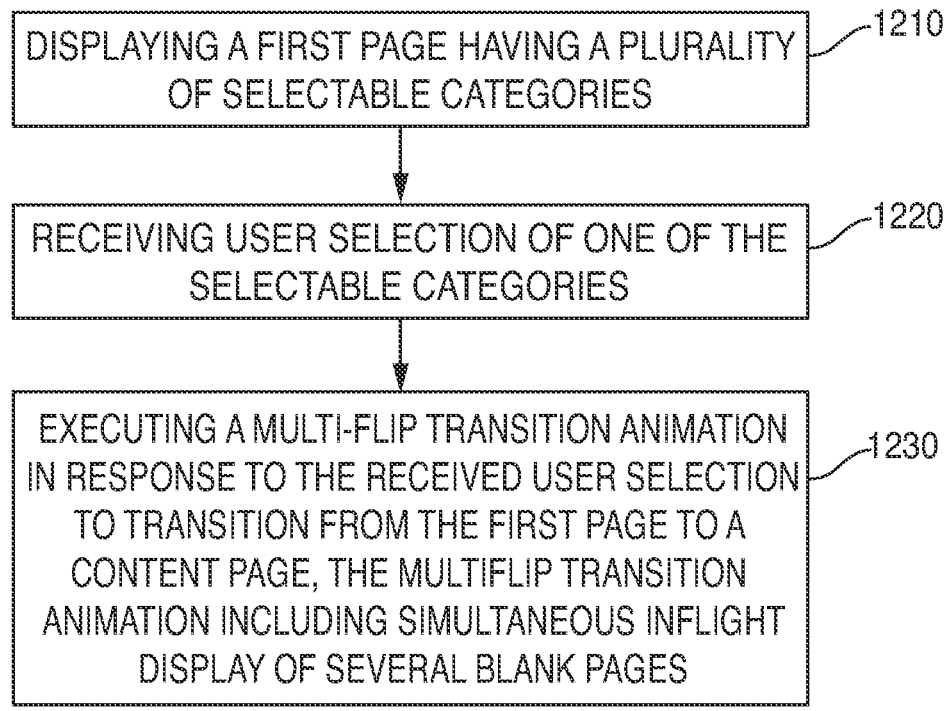
FIG. 12 shows an illustrative flowchart of steps that may be taken to display a blank page multiflip transition animation in accordance with an embodiment of the invention.

FIG. 12 shows an illustrative flowchart of steps that may be taken to display a blank page multiflip transition animation in accordance with an embodiment of the invention. Beginning at step 1210, a first page having a plurality of selectable categories is displayed. For example, a home screen such as the shown in FIG. 1 can be displayed. Then, at step 1220, user selection of on the selectable categories is received. For example, the user can tap on one of the categories.

At step 1230, a multiflip transition animation is executed in response to the received user selection to transition from the first page to a content (or landing) page. The multiflip transition includes simultaneous inflight execution of several blank and is performed automatically after the user selects one of the categories. The content page can be the first page associated with the selected category.

As an alternative to the blank page multiflip embodiment discussed above in connection with FIGS. 11A-J and 12, content pages may be displayed in lieu of the blank pages during the multiflip transition animation. For example, the content can be the actual content of the pages corresponding to the selected category. The multiflip module can select a subset of the content for inclusion in the multiflip transition animation. The content pages can be cached in memory for faster access. In addition, the content pages can be lower resolution versions of the content pages obtained from one or more data sources. In effect, a multiflip transition animation with content may be similar to several fast flip transition animations, but is executed automatically without any input from a user.

It should be understood that processes of FIGS. 9, 10, and 12 are merely illustrative. Any of the steps may be removed, modified, or combined, and any additional steps may be added, without departing from the scope of the invention.

Figure 13:
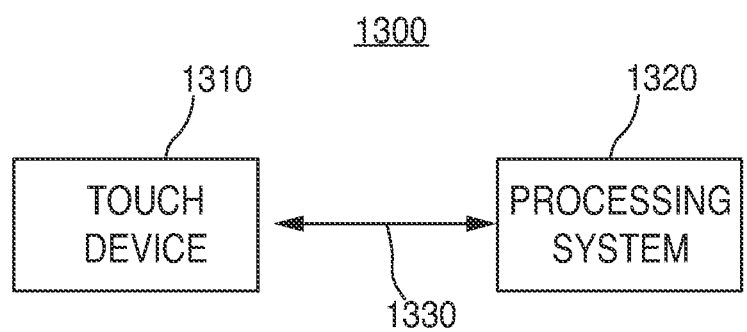
FIGS. 13 and 14 are block diagrams of electronic devices configured in accordance with various embodiments of the invention.

FIG. 13 illustrates a block diagram of electronic device 1300 that includes touch device 1310 that can receive touch input for interacting with processing system 1320 via wired or wireless communication channel 1330. Touch device 1310 may be used to provide user input to processing system 1320 in lieu of or in combination with other input devices such as a keyboard, mouse, etc. One or more touch devices 1310 may be used for providing user input to processing system 13204. Touch device 1310 may be an integral part of processing system 1320 (e.g., touch screen on a laptop) or may be separate from processing system 1320.

Touch device 1310 may include a touch sensitive panel which is wholly or partially transparent, semitransparent, non-transparent, opaque or any combination thereof. Touch device 1310 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch device 1310 embodied as a touch screen may include a transparent and/or semitransparent touch sensitive panel partially or wholly positioned over at least a portion of a display. According to this embodiment, touch device 1310 functions to display graphical data transmitted from processing system 1320 (and/or another source) and also functions to receive user input. In other embodiments, touch device 1310 may be embodied as an integrated touch screen where touch sensitive components/devices are integral with display components/devices. In still other embodiments, a touch screen may be used as a supplemental or additional display screen for displaying supplemental or the same graphical data as a primary display and to receive touch input.

Touch device 1310 may be configured to detect the location of one or more touches or near touches on device 1310 based on capacitive, resistive, optical, acoustic, inductive, mechanical, chemical measurements, or any phenomena that can be measured with respect to the occurrences of the one or more touches or near touches in proximity to device 1310. Software, hardware, firmware or any combination thereof may be used to process the measurements of the detected touches to identify and track one or more gestures. A gesture may correspond to stationary or non-stationary, single or multiple, touches or near touches on touch device 1310. A gesture may be performed by moving one or more fingers or other objects in a particular manner on touch device 1310 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Processing system 1320 may drive a display with graphical data to display a graphical user interface (GUI). The GUI may be configured to receive touch input via touch device 1320. Embodied as a touch screen, touch device 1310 may display the GUI. Alternatively, the GUI may be displayed on a display separate from touch device 1310. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch device 1310 that may be associated with the graphical elements of the GUI. In other embodiments, the user may perform gestures at one or more locations that are independent of the locations of graphical elements of the GUI. Gestures performed on touch device 1310 may directly or indirectly manipulate, control, modify, move, actuate, initiate or generally affect graphical elements such as cursors, icons, media files, lists, text, all or portions of images (e.g., such as pages discussed above in connection with FIGS. 8A-J), or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within processing system 1320 (e.g., affect a state or mode of a GUI, application, or operating system). Gestures may or may not be performed on touch device 1310 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1330 in response to or based on the touch or near touches on touch device 1310. Feedback may be transmitted optically, mechanically, electrically, olfactory, acoustically, or the like or any combination thereof and in a variable or non-variable manner.

Figure 14:
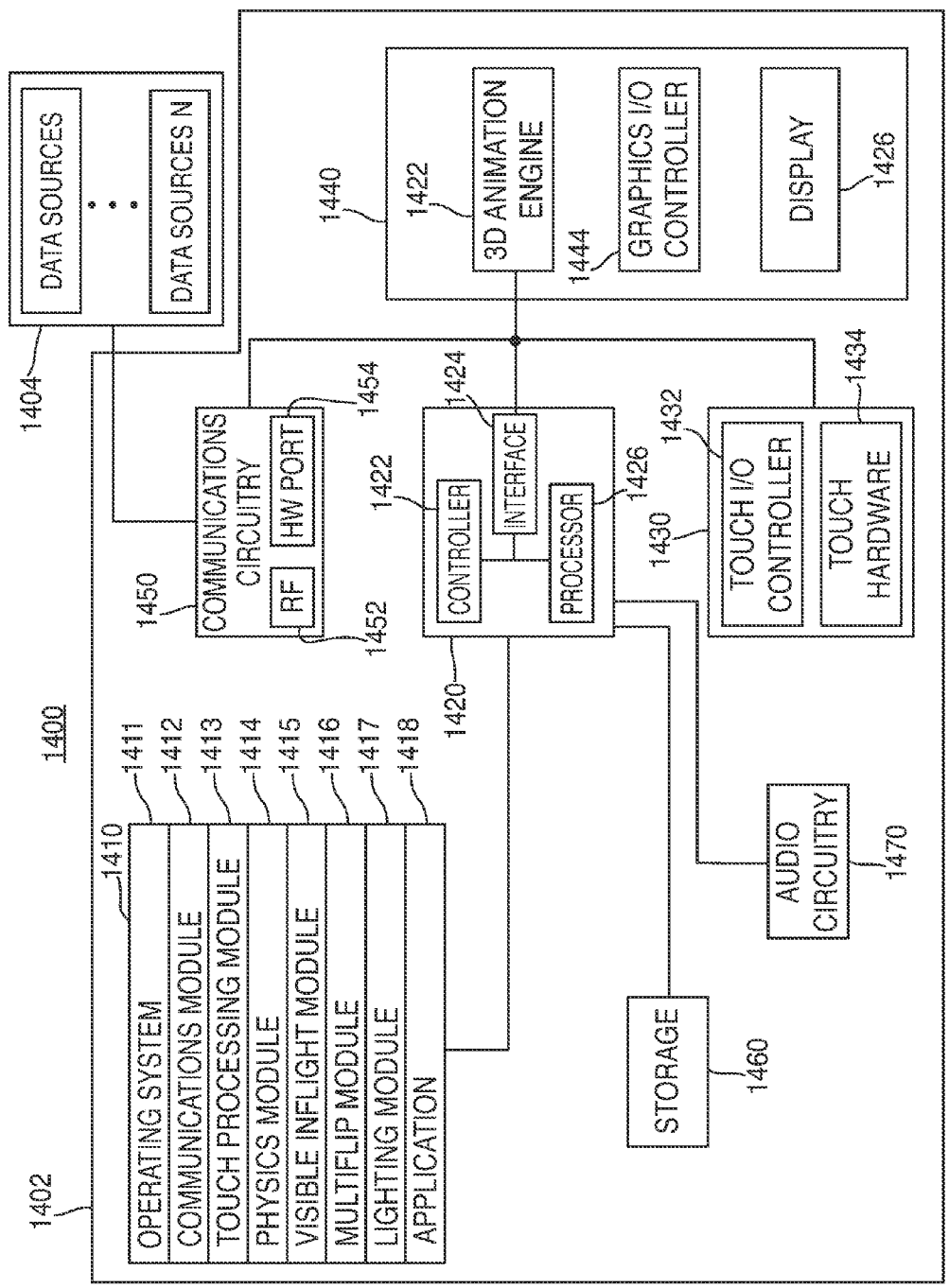

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 1300, including combinations of two or more of these types of devices. FIG. 14 is a block diagram of one embodiment of system 1400 that can include electronic device 1402 and data sources 1404. Electronic device 1402 that can include one or more computer-readable mediums 1410, processing system 1420, touch subsystem 1430, display/graphics subsystem 1440, communications circuitry 1450, storage 1460, and audio circuitry 1470. These components may be coupled by one or more communication buses or signal lines. Electronic device 1402 can be the same as or similar to electronic device 1300 (FIG. 13).

Data sources 1404 represent the various sources from which content can be obtained and ultimately displayed on electronic device 1402. The content can be any suitable media such as, for example, printed media, video media, or audio media. Each data source can provide one or more articles or other content assets that can be viewed on the electronic device. Electronic device 1402 can obtain content from data sources 1404 on demand or at regular intervals. The content at data source 1404 can update continuously.

It should be apparent that the architecture shown in FIG. 14 is only one example architecture of system 1400, and that electronic device 1402 could have more or fewer components than shown, or a different configuration of components. The various components shown in FIG. 14 can be implemented in hardware, software, firmware or any combination thereof, including one or more signal processing and/or application specific integrated circuits.

Communications circuitry 1450 can include RF circuitry 1452 and/or port 1454 for sending and receiving information. RF circuitry 1452 permits transmission of information over a wireless link or network to one or more other devices and includes well-known circuitry for performing this function. Port 1454 permits transmission of information over a wired link. Communications circuitry 1450 can communicate, for example, with data sources 1404. Communications circuitry 1450 can be coupled to processing system 1420 via peripherals interface 1424. Interface 1424 can include various known components for establishing and maintaining communication between peripherals and processing system 1420.

Audio circuitry 1470 can be coupled to an audio speaker (not shown) and a microphone (not shown) and includes known circuitry for processing voice signals received from interface 1424 to enable a user to communicate in real-time with other users. In some embodiments, audio circuitry 1470 includes a headphone jack (not shown).

Peripherals interface 1424 can couple various peripherals of the system to processor 1426 and computer-readable medium 1410. One or more processors 1426 can communicate with one or more computer-readable mediums 1410 via controller 1422. Computer-readable medium 1410 can be any device or medium that can store code and/or data for use by one or more processors 1426. Medium 1410 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1410 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 1426 can run various software components stored in medium 1410 to perform various functions for device 1402. In some embodiments, the software components include operating system 1411, communication module (or set of instructions) 1412, touch processing module (or set of instructions) 1412, physics module (or set of instructions) 1414, inflight module (or set of instructions) 1415, multiflip module (or set of instructions) 1416, lighting module (or set of instructions) 1417, and one or more applications (or set of instructions) 1418. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. In some embodiments, medium 1410 may store a subset of the modules and data structures identified above. Furthermore, medium 1410 may store additional modules and data structures not described above.

Operating system 1411 can include various procedures, sets of instructions, software components and/or drivers for controlling and managing general system tasks (e.g., memory management, storage device control, power management, etc.) and facilitates communication between various hardware and software components.

Communication module 1412 facilitates communication with other devices using communications circuitry 1450 and includes various software components for handling data received from RF circuitry 1452 and/or port 1454.

Touch processing module 1413 includes various software components for performing various tasks associated with touch hardware 14334 including but not limited to receiving and processing touch input received from I/O device 1430 via touch I/O device controller 1432. For example, touch processing module 1413 can also include software components for performing tasks associated with other I/O devices (not shown).

Physics, inflight, multiflip, and lighting modules 1414-1417 include instructions for performing different flip transition animations in accordance with various embodiments of the invention. Modules 1414-1417 may use data provided by other modules within medium 1410 or operate in concert with the modules to execute transition animations.

Physics module 1414 can determine inflight characteristics of transition animations based on gesture inputs processed by touch processing module 1413. For example, physics module 1414 can determine the speed at which the transition animation is performed. As another example, module 1414 can determine whether sufficient momentum is present (based on the input gesture) to enable the transition animation to cross the flip axis and complete its inflight path.

Inflight module 1415 controls the transition animation based on data provided by physics module 1414, touch processing module 1413, lighting module 1417, and/or multiflip module 1416. Inflight module 1415 can include various known software components for rendering, animating and displaying graphical objects on a display surface. In embodiments in which touch hardware 1434 is a touch sensitive display (e.g., touch screen), inflight module 1415 includes components for rendering, displaying, and animating objects on the touch sensitive display. More particularly, module 1415 can provide animation instructions to 3D animation engine 1442, which can render the graphics and provide the rendering to graphics I/O controller 1444 so it can display the graphics on display 1446.

Inflight module 1415 can include instructions for converting pages into animation elements suitable for transition animations. For example, module 1415 can obtain pages from storage 1460 and prepare those pages for transition animations. For example, the pages can be prepared by being "split" into first and second halves. Module 1415 can use fold layers to keep track of which pages to include in a sequence of flip transition animations. Module 1415 can also incorporate lighting layers for each page.

Lighting module 1417 includes instructions for dynamically adjusting the lighting of each page as it moves along its flight path. Multiflip module 1416 includes instructions for simultaneously displaying multiple blank pages as part of a transition from one page to another.

One or more applications 1419 can include any applications installed on system 1402, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch I/O controller 1432 is coupled to touch hardware 1434 for controlling or performing various functions. Touch hardware 1432 communicates with processing system 1420 via touch I/O device controller 1432, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, touch hardware 1434 displays visual output to the user in a GUI. The visual output may include text, graphics, video, and any combination thereof. Some or all of the visual output may correspond to user-interface objects. Touch hardware 1434 forms a touch-sensitive surface that accepts touch input from the user. Touch hardware 1434 and touch controller 1432 (along with any associated modules and/or sets of instructions in medium 1410) detects and tracks touches or near touches (and any movement or release of the touch) on touch hardware 1434 and converts the detected touch input into interaction with graphical objects, such as one or more user-interface objects. In the case in which hardware 1434 is embodied as a touch screen, the user can directly interact with graphical objects that are displayed on the touch screen. Alternatively, in the case in which hardware 1434 is embodied as a touch device other than a touch screen (e.g., a touch pad), the user may indirectly interact with graphical objects that are displayed on a separate display screen.

Embodiments in which touch hardware 1434 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch hardware 1434 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

In some embodiments, peripherals interface 1424, one or more processors 1426, and memory controller 1422 may be implemented on a single chip. In some other embodiments, they may be implemented on separate chips. Storage 1460 can any suitable medium for storing data, including, for example, volatile memory (e.g., cache, RAM), non-volatile memory (e.g., Flash, hard-disk drive), or a both for storing data, including pages used for transition animations.

Notification module 238 can interface with one or more Application Programming Interfaces ("APIs") to provide a notification center that can generate various types of notifications when system 200 is in either a locked state or an unlocked state. Furthermore, notification module 238 can provide multiple settings for customizing the notification center.

The described embodiments of the invention are presented for the purpose of illustration and not of limitation.

What is claimed is:

1. A method comprising:
receiving a gesture input by a user device, the gesture input having a touch down point corresponding to a location on a first page displayed on a display of the user device;
identifying one or more gesture characteristics of gesture input;
determining one or more inflight characteristics of the first page based on one or more of the identified gesture characteristics;
execute a transition animation in accordance with the determined inflight characteristics so that the transition animation of the first page is visible inflight; and
dynamically adjust lighting parameters associated with the transition animation based at least in part on at least one of a light source location or a position of the user device.

2. The method of claim 1, wherein execution of the transition animation sends the first page inflight along a flight path, the first page comprising first and second halves separated by an axis.

3. The method of claim 2, wherein the flight path of the transition animation comprises flipping the first half of the first page about the axis on top of the second half of the first page or flipping the second half of the first page about the axis on top of the first half of the first page.

4. The method of claim 1, wherein the inflight characteristics comprise a speed and direction in which the transition animation is executed.

5. An electronic device, comprising:
a processor to execute instructions; and
a memory coupled with the processor to store instructions, which when executed by the processor, cause the processor to:
receive a first gesture input;
determine inflight characteristics for a first transition animation of a first page based on the first gesture input;

execute the first transition animation of the first page in accordance with one or more of the inflight characteristics of the first page, wherein execution of the transition animation sends the first page inflight along a flight path, the first page comprising first and second halves separated by an axis, wherein during the first transition animation, a half of the first page is mated to a half of a second page, as the first page progresses along the flight path, the mated halves of the first page and the second page flip about the axis, wherein the viewable portions of the first page and the second page change as the first page progresses along the flight path.

6. The electronic device of claim 5, wherein the processor is operative to:
receive a second gesture input while the first transition animation is inflight;
determine inflight characteristics for a second transition animation of the second page; and
execute the second transition animation in accordance with the determined inflight characteristics so that the second transition animation is visible inflight, wherein the first transition animation of the first page and the second transition animation of the second page are simultaneously inflight.

7. The electronic device of claim 6, further comprising dynamically adjust lighting parameters associated with the first and second transition animations based at least in part on a position of the halves of the first page and the second page.

8. The electronic device of claim 6, wherein the processor is operative to:
receive a third gesture input while the first and second transition animations are inflight;
determine inflight characteristics for a third transition animation of a third page; and
execute the third transition animation in accordance with the determined inflight characteristics so that the third transition animation is visible inflight, wherein the first, second, and third transition animations are simultaneously inflight.

9. The electronic device of claim 8, wherein the first transition animation is a user viewable transition from the first page to the second page, and wherein the second transition animation is a user viewable transition from the second page to the third page.

10. The electronic device of claim 9, wherein when the first and second transition animations are simultaneously inflight, the first, second, and third pages are simultaneously user viewable.

11. The electronic device of claim 6, wherein the first and second gesture inputs are swipe gestures, each swipe gesture including a touchdown event, a drag event, and a liftoff event.

12. The electronic device of claim 6, wherein the first and second transition animations are page flipping transition animations.

13. The electronic device of claim 5, wherein the first page is a cover page of a media asset.

14. A method comprising:
displaying, on a display of a user device, a first page having a plurality of content items;
receiving a selection of one of the content items;
executing a transition animation in response to the received user selection to transition from the first page to a selected content page, the transition animation including simultaneous inflight display of a plurality of additional content pages, one or more of the additional content pages including content related to the selected content page; and
dynamically adjusting lighting parameters associated with each additional content page as it progresses along its inflight path based at least in part on at least one of a light source location or a position of the user device.

15. The method of claim 14, wherein the transition animation from the first page to the content page comprises:
visually transitioning from the first page to a first of the additional content pages;
animating the simultaneous inflight display of each of the additional content pages, starting with the first additional content page and ending with a last additional content page; and
visually transitioning from the last additional content page to the selected content page.

16. The method of claim 14, wherein the first page and at least two additional content pages are simultaneously viewable by a user.

17. The method of claim 14, wherein at least two additional content pages and the selected content page are simultaneously viewable by the user.

18. The method of claim 14, wherein at least three additional content pages are simultaneously viewable by the user.

19. The method of claim 14, wherein the plurality of additional content pages have a lower resolution than corresponding versions of the plurality of additional content pages obtained from one or more data sources.

20. The method of claim 14, wherein executing the transition animation comprises:
visually flipping the first page and the additional content pages about a flip axis.

* * * * *